United States Patent
Cullinane

(10) Patent No.: US 11,413,571 B2
(45) Date of Patent: Aug. 16, 2022

(54) REMOVING IMPURITIES FROM A GAS STREAM

(71) Applicant: EXXONMOBIL UPSTREAM RESEARCH COMPANY, Spring, TX (US)

(72) Inventor: J. Tim Cullinane, Montgomery, TX (US)

(73) Assignee: EXXONMOBIL UPSTREAM RESEARCH COMPANY, Spring, TX (US)

( * ) Notice: Subject to any disclaimer, the term of this patent is extended or adjusted under 35 U.S.C. 154(b) by 371 days.

(21) Appl. No.: 16/526,431

(22) Filed: Jul. 30, 2019

(65) Prior Publication Data

US 2020/0061523 A1    Feb. 27, 2020

Related U.S. Application Data

(60) Provisional application No. 62/721,362, filed on Aug. 22, 2018.

(51) Int. Cl.
*B01D 53/14* (2006.01)
*B01D 45/12* (2006.01)
(Continued)

(52) U.S. Cl.
CPC ..... *B01D 53/1406* (2013.01); *B01D 53/1425* (2013.01); *B01D 53/1462* (2013.01);
(Continued)

(58) Field of Classification Search
CPC ........ B01D 2252/204; B01D 2256/245; B01D 2257/504; B01D 2259/10; B01D 45/12;
(Continued)

(56) References Cited

U.S. PATENT DOCUMENTS

| | | | |
|---|---|---|---|
| 4,511,544 A * | 4/1985 | Connell | B01D 53/52 423/576.2 |
| 4,828,768 A | 5/1989 | Talmor | |

(Continued)

FOREIGN PATENT DOCUMENTS

| | | | |
|---|---|---|---|
| EP | 2540376 A1 * | 1/2013 | ......... B01D 53/1462 |
| WO | WO2004/070297 | 8/2004 | |

OTHER PUBLICATIONS

Machine translation of EP-2540376-A1 from Espacenet (Year: 2021).*

(Continued)

*Primary Examiner* — Frank M Lawrence, Jr.
(74) *Attorney, Agent, or Firm* — Vorys, Sater, Seymour and Pease LLP

(57) ABSTRACT

A co-current contacting system for removing impurities from a gas stream is described herein. The co-current contacting system includes a co-current contactor configured to co-currently flow a gas stream including impurities and a liquid stream through the co-current contactor. The co-current contactor is also configured to incorporate liquid droplets formed from the liquid stream into the gas stream, such that the impurities from the gas stream are absorbed by the liquid droplets. The co-current contacting system also includes a separator configured to remove the gas stream from the liquid droplets including the impurities, generating a purified gas stream and a rich liquid stream. The co-current contacting system is configured to recycle the rich liquid stream for reuse as a portion of the liquid stream flowing into the co-current contactor.

17 Claims, 13 Drawing Sheets

(51) Int. Cl.
    *B01D 53/18*     (2006.01)
    *C10L 3/10*     (2006.01)

(52) U.S. Cl.
    CPC ......... *B01D 53/1493* (2013.01); *B01D 53/18* (2013.01); *C10L 3/103* (2013.01); *C10L 3/104* (2013.01); *B01D 2252/204* (2013.01); *C10L 2200/0263* (2013.01); *C10L 2200/0286* (2013.01); *C10L 2290/541* (2013.01); *C10L 2290/544* (2013.01)

(58) Field of Classification Search
    CPC ............ B01D 53/1406; B01D 53/1425; B01D 53/1462; B01D 53/1493; B01D 53/18; B01D 53/185; C10L 2200/0263; C10L 2200/0286; C10L 2290/541; C10L 2290/544; C10L 3/103; C10L 3/104
    USPC ......... 95/165, 166, 169, 178, 179, 183, 187, 95/223, 224, 235, 236; 96/234, 267; 423/228, 229
    See application file for complete search history.

(56) References Cited

U.S. PATENT DOCUMENTS

| | | | |
|---|---|---|---|
| 5,648,048 A * | 7/1997 | Kuroda | B01D 53/504 |
| | | | 422/168 |
| 5,759,233 A | 6/1998 | Schwab | |
| 8,899,557 B2 | 12/2014 | Cullinane et al. | |
| 10,130,897 B2 | 11/2018 | Grave et al. | |
| 10,153,193 B2 | 12/2018 | Cullinane et al. | |
| 10,300,429 B2 | 5/2019 | Grave et al. | |
| 10,343,107 B2 | 7/2019 | Northrop et al. | |
| 10,391,442 B2 | 8/2019 | Freeman et al. | |
| 2002/0110511 A1 * | 8/2002 | Klingspor | B01D 53/18 |
| | | | 423/243.08 |
| 2008/0193353 A1 | 8/2008 | Hirschberg | |
| 2011/0168019 A1 * | 7/2011 | Northrop | B01D 53/1468 |
| | | | 95/186 |
| 2015/0352463 A1 * | 12/2015 | Grave | B01D 53/185 |
| | | | 261/84 |

OTHER PUBLICATIONS

Blard, P., et al. (2017) "Intensification of Volatile Organic Compound Absorption In A Compact Wet Scrubber at Co-Current Flow," Chemosphere, pp. 612-621.

Kies, F., et al. (2004) "Experimental Study on Mass Transfer of A Co-Current Gas-Liquid Contactor Performing Under High Gas Velocities," Chemical Engineering and Processing, pp. 1389-1395.

Kouba, G., et al. (1996) "A Review of Gas-Liquid Cylindrical Cyclone," (GLCC) Technology, XP055639096.

Mamrosh, D., et al. (2008) "Consider Improved Scrubbing Designs for Acid Gases," Hydrocarbon Processing, pp. 69-74.

Mamrosh, D., et al. (2017) "Caustic Scrubber Designs for H2S Removal From Refinery Gas Streams," pp. 1-27.

*World Chlorine Council*, "Chlorine Safety Scrubbing Systems," pp. 2-47, (2011).

* cited by examiner

250

400

500

700

700

700

700

REMOVING IMPURITIES FROM A GAS STREAM

CROSS REFERENCE TO RELATED APPLICATION

This application claims the priority benefit of U.S. Provisional Patent Application No. 62/721,362 filed Aug. 22, 2018, entitled REMOVING IMPURITIES FROM A GAS STREAM.

FIELD

The present techniques provide for the removal of impurities from a gas stream. More specifically, the present techniques provide for the removal of impurities from a gas stream using recycled gas treating solution within a co-current contacting system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon gas stream, the raw gas stream is sometimes referred to as "sour gas." The $H_2S$ and $CO_2$ are often referred to together as "acid gases."

In addition to hydrocarbon production streams, acid gases may be associated with synthesis gas streams, or with refinery gas streams. Acid gases may also be present within so-called flash-gas streams in gas processing facilities. Further, acid gases may be generated by the combustion of coal, natural gas, or other carbonaceous fuels.

Natural gas streams may contain not only $H_2S$ and $CO_2$, but may also contain other "acidic" impurities. These include mercaptans and other trace sulfur compounds ($SO_x$). In addition, natural gas streams may contain water.

Such impurities are often removed prior to industrial or residential use. For example, natural gas streams are typically purified to concentrations of less than 4 parts per million (ppm) $H_2S$ and less than 2 volume % (vol. %) $CO_2$ prior to sale.

Processes have been devised to remove contaminants from a raw natural gas stream. In the case of acid gases, cryogenic gas processing is sometimes used, particularly to remove $CO_2$ to prevent line freezing and plugged orifices. In other instances, particularly with $H_2S$ removal, the raw natural gas stream is treated with a solvent. Solvents may include chemical solvents such as amines Examples of amines used in sour gas treatment include monoethanol amine (MEA), diethanol amine (DEA), and methyl diethanol amine (MDEA).

Physical solvents are sometimes used in lieu of chemical solvents. Examples include SELEXOL™ (available from Dow Chemical Company) and RECTISOL® (available from The Linde Group). However, chemical solvents are generally more effective than physical solvents, particularly at feed gas pressures below about 300 psia (2.07 MPa). In some instances, hybrid solvents, meaning mixtures of physical and chemical solvents, have been used. An example is Sulfinol®.

Chemical solvents, such as amine-based solvents, rely on a chemical reaction between the solvent and the acid gases within the natural gas stream. The reaction process is sometimes referred to as "gas sweetening." As an example, the initial reactions of acid gases with primary amines ($R-NH_2$) are shown below in Eq. 1 and 2.

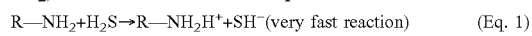
$$R-NH_2 + H_2S \rightarrow R-NH_2H^+ + SH^- \text{(very fast reaction)} \quad \text{(Eq. 1)}$$

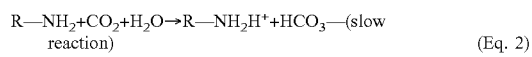
$$R-NH_2 + CO_2 + H_2O \rightarrow R-NH_2H^+ + HCO_3^- \text{(slow reaction)} \quad \text{(Eq. 2)}$$

As shown in Eq. 1, the reaction of $H_2S$ with the amine is inherently very fast and is often considered instantaneous with respect to diffusion and other kinetic limitations. However, as shown in Eq. 2, the reaction of $CO_2$ is somewhat slower. The difference in these reaction rates can be utilized to selectively remove one impurity over another. For example, shale gas often requires $H_2S$ removal with little to no $CO_2$ removal. Therefore, selective $H_2S$ removal is becoming a central part of the processing facility for natural gas assets. To accomplish this, a solvent with a high selectivity for $H_2S$ may be used. The "$H_2S$ selectivity" of the solvent is defined as the ratio of $H_2S$ removal to $CO_2$ removal, which is a function of the respective reaction rates. A high $H_2S$ selectivity may be obtained by using solvents that have a slower reaction rate with $CO_2$. Similarly, the contact time of the gas and liquid phases can be minimized to enhance $H_2S$ uptake over $CO_2$.

As a result of the gas sweetening process, a treated, or "sweetened," gas stream is created. The sweetened gas stream is substantially depleted of $H_2S$ and/or $CO_2$ components. The sweetened gas stream can be further processed for liquids recovery, that is, by condensing out heavier hydrocarbon gases. The sweetened gas stream may be sold into a pipeline or may be used for liquefied natural gas (LNG) feed if the $CO_2$ concentration is less than, for example, about 50 ppm. In addition, the sweetened gas stream may be used as feedstock for a gas-to-liquids process, and then ultimately used to make waxes, butanes, lubricants, glycols, or other petroleum-based products. The extracted $CO_2$ may be sold, or it may be injected into a subterranean reservoir for enhanced oil recovery (EOR) operations.

When a natural gas stream contains water, a dehydration process is usually undertaken before acid gas removal. This is done through the use of glycol or other desiccant in a water separator. The dehydration of natural gas is performed to control the formation of gas hydrates and to prevent corrosion in distribution pipelines. The formation of gas hydrates and corrosion in pipelines can cause a decrease in flow volume as well as frozen control valves, plugged orifices, and other operating problems.

Traditionally, the removal of acid gases or water using chemical solvents or desiccants involves contacting the raw natural gas stream in a counter-current flow with the absorbent chemical. The raw gas stream is introduced into the bottom section of a contacting tower. At the same time, the solvent solution is directed into the top section of the tower. The tower has trays, packing, or other "internals." As the liquid solvent cascades through the internals, it absorbs the undesirable components, carrying them away through the bottom of the contacting tower as part of a "rich" solvent solution. At the same time, gaseous fluid that is largely depleted of the undesirable components exits at the top of the tower.

The rich solvent or rich glycol that exits the contactor is sometimes referred to as an absorbent liquid. Following absorption, a process of regeneration (also called "desorption") may be employed to separate contaminants from the active solvent of the absorbent liquid. This produces a "lean" solvent or a "lean" glycol that is then typically recycled into the contacting tower for further absorption.

Known counter-current contactors used for dehydration or for $H_2S$ and $CO_2$ absorption tend to be very large and heavy. This creates particular difficulty in offshore oil and gas production applications where smaller equipment is desirable. Further, the transport and set-up of large tower-based facilities is difficult for shale gas production operations that frequently take place in remote locations.

An important characteristic that affects the equipment size in solvent-based absorption is the acid gas loading. This is defined as the amount of acid gas (typically in moles) absorbed into the solvent (typically expressed as moles of amine) The cyclic capacity of the system is defined as the difference in rich loading and lean loading.

In this manner, the solvent loading is related to the overall circulation rate of the solvent. For example, this relationship may be expressed as X moles/second of acid gas being absorbed into Y gallons/minute of solvent at a given amine concentration. Minimization of the solvent circulation rate is important because the solvent circulation rate determines the size of the equipment in the liquid circuit and the heat duty required for regeneration. Thus, it is desirable to maximize the cyclic capacity, i.e., to absorb the highest amount of acid gas possible with the least amount of solvent. However, in competitive absorption, known counter-current contactors fail to adequately maximize cyclic capacity of the preferred component. This is a major contributing factor to the overall size and weight of such gas treating systems.

SUMMARY

An exemplary embodiment provides a co-current contacting system for removing impurities from a gas stream. The co-current contacting system includes a co-current contactor configured to co-currently flow a gas stream including impurities and a liquid stream through the co-current contactor. The co-current contactor is also configured to incorporate liquid droplets formed from the liquid stream into the gas stream, such that the impurities from the gas stream are absorbed by the liquid droplets. The co-current contacting system also includes a separator configured to remove the gas stream from the liquid droplets including the impurities, generating a purified gas stream and a rich liquid stream. The co-current contacting system is configured to recycle the rich liquid stream for reuse as a portion of the liquid stream flowing into the co-current contactor.

Another exemplary embodiment provides a method for removing impurities from a gas stream. The method includes co-currently flowing a liquid stream and a gas stream including impurities into a co-current contactor of a co-current contacting system, and contacting liquid droplets formed from the liquid stream with the gas stream within the co-current contactor, such that the impurities from the gas stream are absorbed by the liquid droplets. The method also includes removing the gas stream from the liquid droplets including the impurities within a separator of the co-current contacting system, forming a purified gas stream and a rich liquid stream. The method further includes recycling the rich liquid stream back into the co-current contactor as a portion of the liquid stream.

Another exemplary embodiment provides a gas processing system for removing impurities from a gas stream. The gas processing system includes a first co-current contacting system. The first co-current contacting system includes a first co-current contactor configured to co-currently flow a gas stream including impurities and a first liquid stream through the first co-current contactor, and incorporate first liquid droplets formed from the first liquid stream into the gas stream, such that the impurities from the gas stream are absorbed by the first liquid droplets. The first co-current contacting system also includes a first separator configured to remove the gas stream from the first liquid droplets including the impurities, forming a first rich liquid stream and a partially-purified gas stream including residual impurities. The first co-current contacting system is configured to flow a portion of the first rich liquid stream back to the first co-current contactor for use as a first portion of the first liquid stream. The gas processing system also includes a second co-current contacting system. The second co-current contacting system includes a second co-current contactor configured to co-currently flow the partially-purified gas stream including the residual impurities and a second liquid stream through the second co-current contactor, and incorporate second liquid droplets formed from the second liquid stream into the partially-purified gas stream, such that the residual impurities from the partially-purified gas stream are absorbed by the second liquid droplets. The second co-current contacting system also includes a second separator configured to remove the partially-purified gas stream from the second liquid droplets including the residual impurities, forming a purified gas stream and a second rich liquid stream. The second co-current contacting system is configured to flow a first portion of the second rich liquid stream back to the second co-current contactor for use as a first portion of the second liquid stream, and flow a second portion of the second rich liquid stream back to the first co-current contactor for use as a second portion of the first liquid stream.

Another exemplary embodiment provides a gas processing system. The gas processing system includes a co-current contacting system configured to remove impurities from a gas stream using a liquid stream that is reused within the co-current contacting system via intra-stage recycling.

DESCRIPTION OF THE DRAWINGS

The advantages of the present techniques are better understood by referring to the following detailed description and the attached drawings, in which.

DETAILED DESCRIPTION

Figure 1:
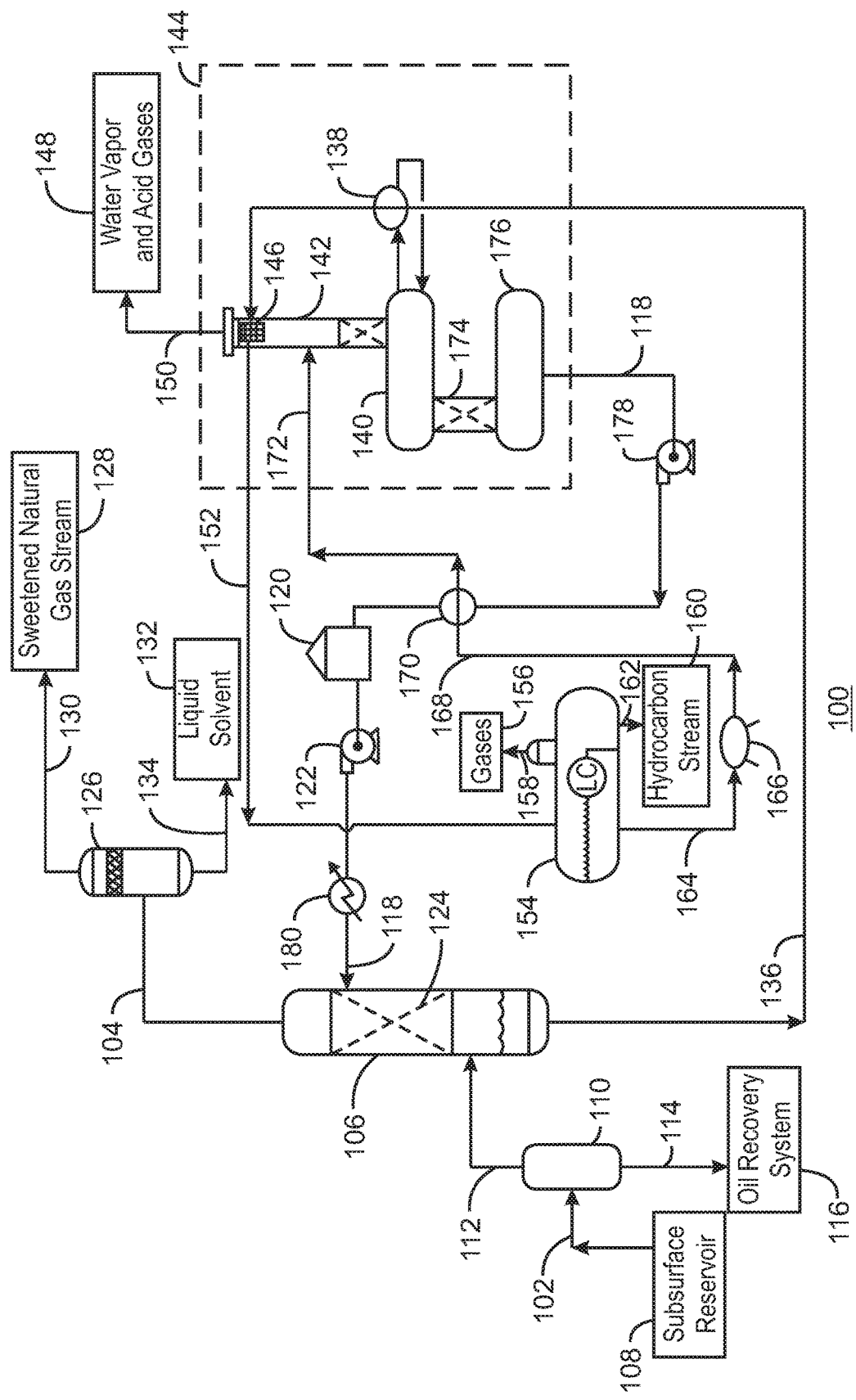
FIG. 1 is a process flow diagram of a conventional gas processing facility.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that dissolves in water, producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contacting device" or "co-current contactor" refers to a vessel that receives a stream of gas and a separate stream of gas treating solution, or solvent, in such a manner that the gas stream and the solvent stream contact one another while flowing in generally the same directions within the contactor.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties. In an absorbent column, a physical solvent is injected into the top, while a mixture of gases to be separated is flowed through the bottom. As the gases flow upwards through the falling stream of absorbent, one gas species is preferentially absorbed, lowering its concentration in the vapor stream exiting the top of the column. A portion of the overhead vapor may be condensed and pumped back into the top of the column as a reflux stream, which can be used to enhance the separation and purity of the overhead product. A bulk liquid stripper is related to a fractionation column. However, the bulk liquid stripper functions without the use of a reflux stream and, thus, cannot produce a high-purity overhead product.

In a distillation column, a gas stream may be separated into multiple components based on boiling point or vapor pressure differences. The high vapor pressure, or lower boiling point, components will tend to concentrate in the vapor phase, whereas the low vapor pressure, or higher boiling point, components will tend to concentrate in the liquid phase. Cryogenic separation is a separation process carried out in a column at least in part at temperatures at or below 150 degrees Kelvin (K). To enhance the separation, both types of columns may use a series of vertically spaced trays or plates mounted within the column and/or packing elements such as structured or random packing. Columns may often have a recirculated stream at the base to provide heat energy for boiling the fluids, called reboiling.

The term "dehydrated natural gas stream" refers to a natural gas stream that has undergone a dehydration process. Typically, the dehydrated natural gas stream has a water content of less than 50 ppm, and preferably less than 7 ppm. Any suitable process for dehydrating the natural gas stream can be used. Typical examples of suitable dehydration processes include, but are not limited to, treatment of the natural gas stream with molecular sieves or dehydration using glycol or methanol. Alternatively, the natural gas stream can be dehydrated by formation of methane hydrates; for example, using a dehydration process as described in WO2004/070297.

As used herein, the term "dehydration" refers to the pre-treatment of a raw feed gas stream to partially or completely remove water and, optionally, some heavy hydrocarbons. This can be accomplished by means of a pre-cooling cycle, against an external cooling loop or a cold internal process stream, for example. Water may also be removed by means of pre-treatment with molecular sieves, e.g. zeolites, or silica gel or alumina oxide or other drying agents. Water may also be removed by means of washing with glycol, monoethylene glycol (MEG), diethylene glycol (DEG) or triethylene glycol (TEG), or glycerol. The amount of water in the gas feed stream is suitably less than 1 vol. %, preferably less than 0.1 vol. %, more preferably less than 0.01 vol. %.

The term "distillation," or "fractionation," refers to the process of physically separating chemical components into a vapor phase and a liquid phase based on differences in the components' boiling points and vapor pressures at specified temperatures and pressures. Distillation is typically performed in a "distillation column," which includes a series of vertically spaced plates. A feed stream enters the distillation column at a mid-point, dividing the distillation column into two sections. The top section may be referred to as the rectification section, and the bottom section may be referred to as the stripping section. Condensation and vaporization occur on each plate, causing lower boiling point components to rise to the top of the distillation column and higher boiling point components to fall to the bottom. A re-boiler is located at the base of the distillation column to add thermal energy. The "bottoms" product is removed from the base of the distillation column A condenser is located at the top of the distillation column to condense the product emanating from the top of the distillation column, which is called the distillate. A reflux pump is used to maintain flow in the rectification section of the distillation column by pumping a portion of the distillate back into the distillation column.

The term "enhanced oil recovery" (EOR) refers to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells.

As used herein, the term "fluid" refers to gases, liquids, and combinations of gases and liquids, as well as to combinations of gases and solids, and combinations of liquids and solids.

The term "flue gas" refers to any gas stream generated as a by-product of hydrocarbon combustion.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_2$, $C_2H_4$, $C_2H_6$, $C_3$ isomers, $C_4$ isomers, benzene, and the like.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device.

The term "industrial plant" refers to any plant that generates a gas stream containing at least one hydrocarbon or an acid gas. One non-limiting example is a coal-powered electrical generation plant. Another example is a cement plant that emits $CO_2$ at low pressures.

"Liquefied natural gas" (LNG) is natural gas generally known to include a high percentage of methane. However, LNG may also include trace amounts of other compounds. The other elements or compounds may include, but are not limited to, ethane, propane, butane, carbon dioxide, nitrogen, helium, hydrogen sulfide, or combinations thereof, that have been processed to remove components (for instance, helium) or impurities (for instance, water and/or heavy hydrocarbons) and then condensed into a liquid at almost atmospheric pressure by cooling.

The term "liquid solvent" refers to a fluid in substantially liquid phase that preferentially absorbs one component over another. For example, a liquid solvent may preferentially absorb an acid gas, thereby removing or "scrubbing" at least a portion of the acid gas component from a gas stream or a water stream. Moreover, a liquid solvent may preferentially absorb one acid gas over another.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), acid gases (e.g., carbon dioxide or hydrogen sulfide), or any combinations thereof. The natural gas can also contain minor amounts of contaminants such as water, nitrogen, iron sulfide, wax, crude oil, or any combinations thereof. The natural gas stream may be substantially purified prior to use in embodiments described herein, so as to remove compounds that may act as poisons.

"Non-absorbing gas" means a gas that is not significantly absorbed by a solvent during a gas treating or conditioning process.

As used herein, "purification" includes separation processes by which impurities that may cause problems to downstream processes may be removed. The separation processes may include any number of processes known in the art, such as dehydration, distillation, controlled oxidation of impurities, cold box separation, cryogenic separations, and the like.

"Solvent" refers to a substance capable at least in part of dissolving or dispersing other substances, such as to provide or form a solution. The solvent may be polar, nonpolar, neutral, protic, aprotic, or the like. The solvent may include any suitable element, molecule, or compound, such as methanol, ethanol, propanol, glycols, ethers, ketones, other alcohols, amines, salt solutions, or the like. The solvent may include physical solvents, chemical solvents, or the like. The solvent may operate by any suitable mechanism, such as physical absorption, chemical absorption, chemisorption, physisorption, adsorption, pressure swing adsorption, temperature swing adsorption, or the like. Specific solvents that are useful for acid gas absorption include, but are not limited to, monoethanolamine (MEA), 2(2-aminoethoxy) ethanol [Diglycolamine® (DGA)], diethanolamine (DEA), diisopropanolamine (DIPA), methyldiethanolamine (MDEA), triethyleneamine, FLEXSORB® SE, 2-amino-2methyl-1-propanol (AMP), or formulated amines such as FLEXSORB® SE PLUS, the UCARSOL™ family of products, or formulated MDEA solutions.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "sweetened natural gas stream" refers to a natural gas stream that has had at least a portion of acid gas components removed.

Overview

The present techniques provide for the removal of impurities from a gas stream using recycled gas treating solution within co-current contacting systems. The gas treating solution may be any liquid that is capable of absorbing the impurities within the gas stream. For example, in various embodiments, the gas stream may be a natural gas stream, and the impurities may be acid gases, such as $H_2S$ and $CO_2$. In such embodiments, the gas treating solution may be an amine-based solvent that is capable of absorbing the acid gases within the natural gas stream.

Each co-current contacting system may include a co-current contactor that facilitates the absorption of the impurities into the gas treating solution. In addition, each co-current contacting system may include a separator that is capable of separating the gas stream from the gas treating solution with the absorbed impurities.

Furthermore, each co-current contacting system may reuse at least a portion of the gas treating solution. More specifically, each co-current contacting system may recycle a portion of the gas treating solution within the co-current contacting system. Moreover, in the case of two or more co-current contacting systems connected in series, the co-current contacting systems may provide for inter-stage recycling of gas treating solution between the co-current contacting systems. For example, each co-current contacting system (with the exception of the first co-current contacting system) may recycle a portion of its used gas treating solution to a preceding co-current contacting system. In some embodiments, the first co-current contacting system may send a portion of its used gas treating solution to a regeneration system. The regeneration system may remove the impurities from the gas treating solution and, in some embodiments, send at least a portion of the regenerated gas treating solution to the co-current contacting systems.

The co-current contacting systems described herein may provide for the efficient removal of impurities from a gas stream, generating a purified gas stream. The use of recycled gas treating solution within each co-current contacting system, as well as between multiple co-current contacting systems, increases the efficiency of the overall system. This, in turn, allows for the use of more compact equipment within the system, and reduces the amount of energy used for the gas purification process.

Gas Processing System

FIG. 1 is a process flow diagram of a conventional gas processing facility 100. The gas processing facility 100 may be used to remove acid gases, such as $H_2S$ and $CO_2$, from a sour natural gas stream 102, generating a sweetened natural gas stream 104. This may be accomplished by flowing a sour natural gas stream 102 into a contactor 106, which may remove the acid gases from the sour natural gas stream 102. The sweetened natural gas stream 104 may then be flowed out of the contactor 106 as an overhead stream. In addition, residual water and acid gas components may be removed in connection with a subsequent process, as discussed further herein.

The sour natural gas stream 102 may be a raw natural gas stream obtained from a subsurface reservoir 108 via any suitable type of hydrocarbon recovery operation. The sour natural gas stream 102 may include a non-absorbing gas, such as methane. The sour natural gas stream 102 may include about 1 to about 10% $H_2S$ and about 1 to about 10% $CO_2$, along with the hydrocarbon gas. In addition, the sour natural gas stream 102 may include other impurities, such as water.

As shown in FIG. 1, the sour natural gas stream 102 may be flowed into an inlet separator 110 upon entry into the gas processing facility 100. When entering the inlet separator 110, the sour natural gas stream 102 may be under a large amount of pressure. However, the pressure of the sour natural gas stream 102 may vary considerably, depending on the characteristics of the subsurface reservoir 108 from which the gas product is produced. For example, the pressure of the sour natural gas stream 102 may range between atmospheric pressure and several thousand psig. For natural gas treating applications, the pressure of the sour natural gas stream 102 may be boosted to about 100 psig, or about 500 psig, or greater, if desired.

The inlet separator 110 may clean the sour natural gas stream 102, for example, to prevent foaming of liquid solvent during the acid gas treatment process. This may be accomplished by separating the sour natural gas stream 102 into liquid-phase components and gas-phase components. The liquid-phase components may include heavy hydrocarbons, water, and impurities such as brine and drilling fluids. Such components may be flowed out of the inlet separator 110 via a bottoms line 114, and may be sent to an oil recovery system 116. The gas-phase components may include natural gas and some amount of impurities, such as acid gases and water. Such components may be flowed out of the inlet separator 110 as the overhead natural gas stream 112.

From the inlet separator 110, the natural gas stream 112 may be flowed into the contactor 106. The contactor 106 may use a liquid solvent stream 118 to absorb acid gases in the natural gas stream 112. The liquid solvent stream 118 may be a chemical solvent, such as a primary amine, a secondary amine, or a tertiary amine More specifically, the liquid solvent stream 118 may be any solvent that is useful for acid gas absorption.

The liquid solvent stream 118 may be stored in a tank 120. A pump 122 may force the liquid solvent stream 118 from the tank 120 into the contactor 106 under suitable pressure. For example, the pump 122 may boost the pressure of the liquid solvent stream 118 to about 1,000 psig or higher, depending on the pressure of the sour natural gas stream 102.

Once inside the contactor 106, gas within the natural gas stream 112 moves upward through the contactor 106. Typically, trays 124, or other internal structures, are provided within the contactor 106 to create indirect flow paths for the natural gas stream 112 and to create interfacial area between the gas and liquid phases. At the same time, the liquid from the liquid solvent stream 118 moves downward and across the succession of trays 124 in the contactor 106. The trays 124 aid in the interaction of the natural gas stream 112 with the liquid solvent stream 118.

The contactor 106 operates on the basis of a counter-current flow scheme. In other words, the natural gas stream 112 is directed through the contactor 106 in one direction, while the liquid solvent stream 118 is directed through the contactor 106 in the opposite direction. As the two fluid materials interact, the down-flowing liquid solvent stream 118 absorbs acid gases from the up-flowing natural gas stream 112 to produce the sweetened natural gas stream 104.

Upon exiting the contactor 106, the sweetened natural gas stream 104 can be flowed through an outlet separator 126. The outlet separator 126, also referred to as a scrubber, may allow any liquid solvent carried over from the contactor 106 to fall out of the sweetened natural gas stream 104. The outlet separator 126 may also be used as a water wash vessel to capture vapor-phase solvent. A final sweetened natural gas stream 128 may be flowed out of the outlet separator 126 via an overhead line 130. Any residual liquid solvent 132 may drop out through a bottoms line 134.

A spent solvent stream 136 flows from the bottom of the contactor 106. The spent solvent stream 136 may be a solvent solution that is rich in the absorbed acid gases. The spent solvent stream 136 may be at a relatively high temperature, such as about 90° F. to about 102° F., or higher. In various embodiments, the gas processing facility 100 includes equipment for regenerating the liquid solvent stream 118 from the spent solvent stream 136, as discussed further herein.

From the contactor 106, the spent solvent stream 136 may be flowed through a heat exchanger 138. Within the heat exchanger 138, the spent solvent stream 136 may be cooled, providing heat to a reboiler 140 that is coupled to a distillation column 142 within a regenerator 144. The regenerator 144 may be used to regenerate the liquid solvent stream 118 from the spent solvent stream 136. The regenerator 144 may be a large pressure vessel, or interconnected series of pressure vessels, that operates at about 15 psig to about 25 psig, for example.

The spent solvent stream 136 can be flowed through a tube bundle 146 in the top of the distillation column 142.

High-temperature water vapor and acid gases 148 being released from the distillation column 142 may preheat the spent solvent stream 136 as it flows through the tube bundle 146, before the water vapor and acid gases 148 are released via an overhead line 150.

After being preheated within the distillation column 142, the spent solvent stream 136 may be released from the tube bundle 146 as a warmed solvent stream 152. The warmed solvent stream 152 may be flowed into a flash drum 154. The flash drum 154 may operate at a pressure of about 50 psig to 100 psig, for example. The flash drum 154 may have internal parts that create a mixing effect or a tortuous flow path for the solvent stream 152. Residual gases 156, such as acid gases and methane, may be flashed out of the flash drum 154 via an overhead line 158. The residual gases 156 captured in the overhead line 158 may be reduced to an acid gas content of about 100 ppm if contacted with an amine-based solvent. This concentration of acid gases is small enough that the residual gases 156 can be used as fuel gas for the gas processing facility 100.

In addition, any entrained heavier hydrocarbons, such as ethane or propane, within the solvent stream 152 may be captured within the flash drum 154. The resulting hydrocarbon stream 160 may be flowed out of the flash drum 154 via a bottoms line 162.

Further, as the temperature and pressure of the solvent stream 152 drops within the flash drum 154, the hydrocarbons within the solvent stream 152 are separated out, producing a partially-purified solvent stream 164. The partially-purified solvent stream 164 may then be released from the flash drum 154. The partially-purified solvent stream 164 may be flowed through a filter 166, such as a carbon filter, for particle filtration.

The resulting filtered solvent stream 168 may then be flowed through a heat exchanger 170. Within the heat exchanger 170, the filtered solvent stream 168 may be heated via heat exchange with the liquid solvent stream 118. The resulting high-temperature solvent stream 172 may be flowed into the distillation column 142 of the regenerator 144. As the high-temperature solvent stream 172 travels through the distillation column 142, water vapor and acid gases 148, such as $H_2S$ and $CO_2$, may be removed from the high-temperature solvent stream 172.

The high-temperature solvent stream 172 may be flowed out of the bottom of the distillation column 142 and into the reboiler 140. The reboiler 140 may increase the temperature of the solvent stream 172 using the heat generated by the heat exchanger 138. In addition, the reboiler 140 may boil off residual water vapor and acid gases 148 from the high-temperature solvent stream 172. The components that are boiled off may travel upward through the distillation column 142 and become the water vapor and acid gases 148 in the overhead line 150.

The regenerator 144 may also include a separate stripping section 174 fed from the liquid pool in the reboiler 140. The stripping section 174 may include packing that promotes further distillation. Any remaining impurities, such as water, $H_2S$, or $CO_2$, boil off and join the water vapor and acid gases 148 in the overhead line 150. The solvent stream 172 may then be flowed into a surge tank 176, from which it may be released as the liquid solvent stream 118.

The regenerated liquid solvent stream 118 may be pumped out of the surge tank 176 via a pump 178. The pump 178 may increase the pressure of the liquid solvent stream 118 to about 1,500 psig or about 2,500 psig, for example.

The liquid solvent stream 118 is then flowed through the heat exchanger 170. Heat exchanged with the filtered solvent stream 168 in the heat exchanger 170 may serve to partially cool the liquid solvent stream 118. In addition, the liquid solvent stream 118 may be flowed through a cooler 180 prior to being returned to the contactor 106. The cooler 180 may cool the liquid solvent stream 118 to ensure that the liquid solvent stream 118 is not flashing when it is returned to the contactor 106. For example, the cooler 180 may chill the liquid solvent stream 118 to around 100° F. to 125° F.

The process flow diagram of FIG. 1 is not intended to indicate that the gas processing facility 100 is to include all of the components shown in FIG. 1. Further, any number of additional components may be included within the gas processing facility 100, depending on the details of the specific implementation. For example, the gas processing facility 100 may include any suitable types of heaters, chillers, condensers, liquid pumps, gas compressors, blowers, bypass lines, other types of separation and/or fractionation equipment, valves, switches, controllers, pressure-measuring devices, temperature-measuring devices, level-measuring devices, or flow-measuring devices, among others.

FIG. 1 demonstrates the use of a known contactor 106 in the context of an acid gas treatment process. However, the gas processing facility 100 is also substantially representative of other types of purification processes. For example, the gas processing facility may be used in the context of a dehydration process. In that instance, the liquid solvent stream 118 may be a desiccant, such as a liquid glycol.

In some embodiments, a solvent that preferentially removes $H_2S$ molecules over $CO_2$ molecules may be used within the gas processing facility 100. For example, a tertiary amine typically does not effectively strip out $CO_2$ as quickly as $H_2S$. Such solvents may be useful for removing $H_2S$ from shale gas, which often includes a large amount of $H_2S$ but a negligible amount of $CO_2$. Moreover, two separate gas processing facilities 100 may be sequentially operated, with one configured to strip out primarily $H_2S$, and the other configured to strip out primarily $CO_2$. A separate $CO_2$ stream that is substantially free of $H_2S$ may also be generated.

Regardless of the application and the solvent used, the disadvantage of gas processing systems that include counter-current flow schemes, such as the conventional gas processing facility 100 of FIG. 1, is that comparatively low velocities are required to avoid entrainment of the downflowing liquid solvent in the sour natural gas stream 102. Also, relatively long distances are required for disengagement of the liquid droplets from the sour natural gas stream 102. Depending on the flow rate of the sour natural gas stream 102, the contactor 106 can be greater than 15 feet in diameter and more than 100 feet tall. For high-pressure applications, the vessel has thick, metal walls. Consequently, counter-current contactor vessels can be large and very heavy. This is expensive and undesirable, particularly for offshore oil and gas recovery applications.

In the gas processing facility 100 of FIG. 1, the contactor 106 includes a single contacting tower. However, in some applications, more than one contacting tower may be used. In addition, very large contactors may be used for high-volume, high-pressure applications. In the case of low-pressure applications, such as $CO_2$ removal from flue gas at a power generation plant, it is estimated that a 50 foot by 50 foot duct contactor would be used for a relatively small, 500 megawatt power plant flue gas application. Many hundreds of gallons per minute of solvent would also be flowed through the contactor. Thus, such operations may become very costly.

Further, the internals of the contactor 106 can make it susceptible to wave motion in an offshore environment. Therefore, it may be desirable to have a mass transfer process that does not rely on conventional tower internals. For example, it may be desirable to utilize a series of low pressure-drop, small contacting devices to remove $CO_2$ or $H_2S$ from flash-gas streams.

Embodiments described herein utilize a co-current flow scheme as an alternative to the counter-current flow scheme demonstrated in the contactor 106 of FIG. 1. The co-current flow scheme utilizes co-current contacting systems connected in series within a pipe. A natural gas stream and a liquid solvent move together, i.e., co-currently, within the co-current contacting systems. In some embodiments, the natural gas stream and the liquid solvent move together generally along the longitudinal axis of the respective co-current contacting system. In general, co-current contactors are not subject to the same hydraulic capacity limitations as counter-current contactors. As a result, co-current contactors tend to be smaller than counter-current contactors that utilize standard packed or trayed towers.

Figure 2A:
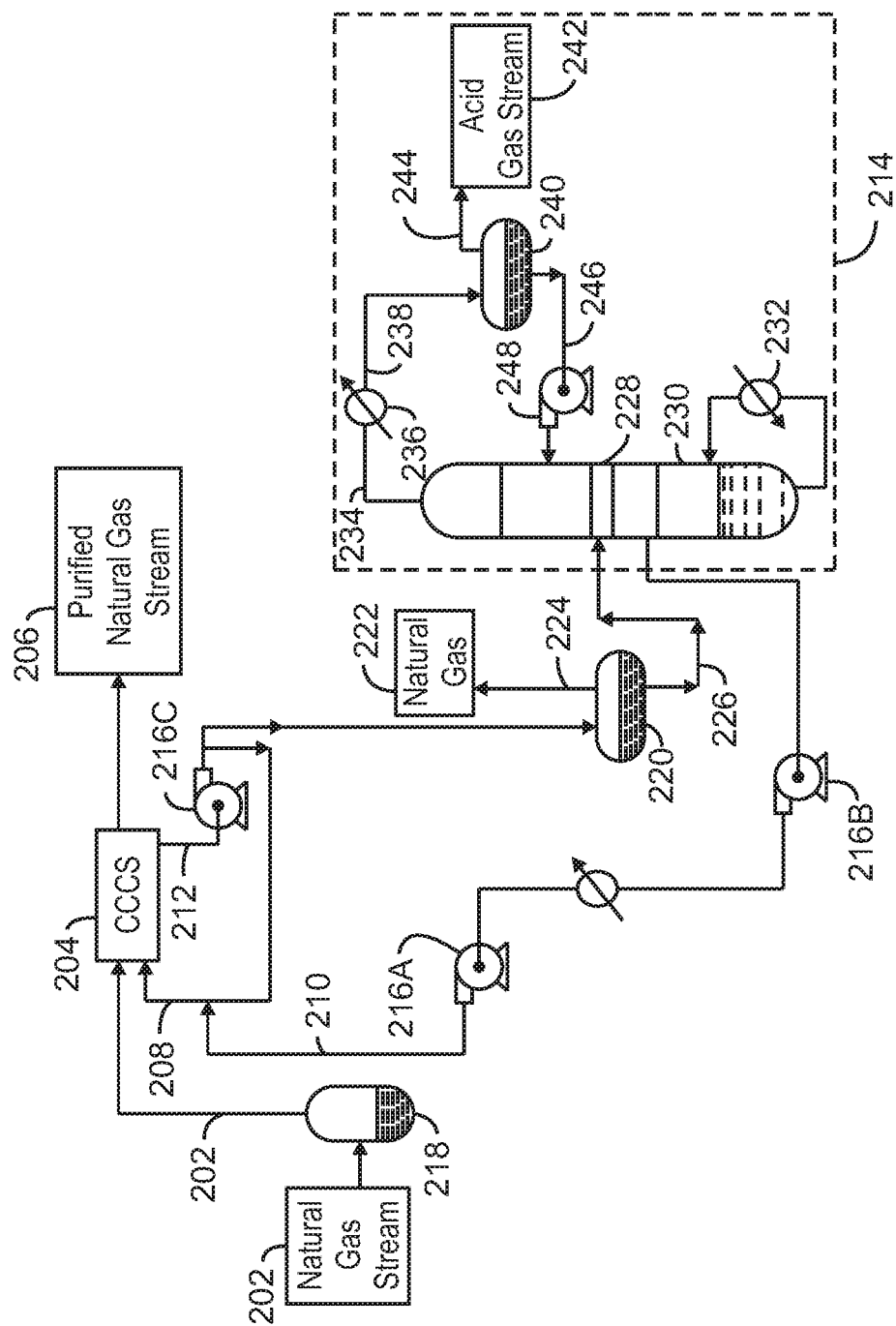
FIG. 2A is a process flow diagram of a gas processing system that includes a co-current flow scheme.

FIG. 2A is a process flow diagram of a gas processing system 200 that includes a co-current flow scheme. The gas processing system 200 may be an alternative to the gas processing facility 100 discussed with respect to FIG. 1. The gas processing system 200 may be used to purify a natural gas stream 202 by removing impurities, such as $H_2S$ or other acid gas components, from the natural gas stream 202. In some embodiments, the gas processing system 200 is used to preferentially remove $H_2S$ over $CO_2$. In addition, in some embodiments, the gas processing system 200 is used for the removal of water or other impurities from the natural gas stream 202. The gas processing system 200 employs a co-current contacting system 204. The co-current contacting system 204 may include a co-current contactor (not shown) and a separator (not shown), as discussed further with respect to FIG. 5.

The gas stream 202 may be a natural gas stream from a hydrocarbon production operation. For example, the gas stream 202 may be a raw natural gas stream extracted from a shale formation using hydraulic fracturing. The gas stream 202 may also be a flash gas stream taken from a flash drum in a gas processing facility itself. In addition, the gas stream 202 may be a tail gas stream from a Claus sulfur recovery process or an impurities stream from a regenerator. Furthermore, the gas stream 202 may be an exhaust emission from a cement plant or other industrial plant. In this instance, $CO_2$ may be absorbed from excess air or from a nitrogen-containing flue gas.

The gas stream 202 may include a non-absorbing gas, such as methane, and impurities, such as acid gases. For example, the gas stream 202 may include $H_2S$ and $CO_2$. The gas processing system 200 may convert the gas stream 202 into a purified natural gas stream 206 by removing the acid gases.

In some embodiments, particularly when the natural gas stream 202 is a raw natural gas stream from a shale formation, the gas stream 202 may include a high percentage of $H_2S$ and a low percentage of $CO_2$. Therefore, it may be desirable to selectively remove $H_2S$ from the gas stream 202 within the gas processing system 200.

In operation, the natural gas stream 202 may be flowed into the co-current contacting system 204, where it is mixed with a gas treating solution 208. As used herein, the term "gas treating solution" may include any liquid that is capable of removing impurities from a gas stream. For example, if the gas processing system 200 is to be used for the removal of $H_2S$ or other sulfur compounds, the gas treating solution 208 may include an amine-based solvent, or any solvent that is capable of absorbing acid gases. Such solvents may include, but are not limited to, monoethanolamine (MEA), 2(2-aminoethoxy) ethanol [Diglycolamine (DGA)], diethanolamine (DEA), diisopropanolamine (DIPA), methyldiethanolamine (MDEA), triethyleneamine, FLEXSORB® SE, 2-amino-2methyl-1-propanol (AMP), or formulated amines such as FLEXSORB® SE PLUS, the UCARSOL™ family of products, or formulated MDEA solutions. Other solvents, such as physical solvents, alkaline salts solutions, or ionic liquids, may also be used for $H_2S$ removal. In embodiments used for other purposes, such as dehydration, other solvents or reactants, such as glycols, may be used.

In various embodiments, the gas treating solution 208 is a mixture of a lean gas treating solution 210 and a partially-loaded gas treating solution 212. The lean gas treating solution 210 may be gas treating solution that has undergone a desorption process for the removal of acid gas impurities. This may be accomplished using a regenerator 214. Movement of the lean gas treating solution 210 from the regenerator 214 to the co-current contacting system 204 may aided using a first pump 216A and a second pump 216B.

The partially-loaded gas treating solution 212 may be rich gas treating solution that includes impurities that were removed from the natural gas stream 202. Moreover, the partially-loaded gas treating solution 212 may be gas treating solution that has undergone intra-stage recycling within the co-current contacting system 204. More specifically, the partially-loaded gas treating solution 212 may be flowed out of the bottom of the co-current contacting system 204, combined with the lean gas treating solution 210, and then flowed back into the front of the co-current contacting system 204 with the aid of a third pump 216C. The pumps 216A-C may cause the gas treating solution 208 to flow into the co-current contacting system 204 at a suitable pressure, for example, of about 15 psia to about 1,500 psig. Before entering the co-current contacting system 204, the natural gas stream 202 may pass through an inlet separator 218. The inlet separator 218 may be used to clean the natural gas stream 202 by filtering out impurities, such as brine and drilling fluids. Some particle filtration may also take place. The cleaning of the natural gas stream 202 can prevent foaming of solvent during the acid gas treatment process.

In some embodiments, the natural gas stream 202 is also pretreated upstream of the inlet separator 218 or the co-current contacting system 204. For example, the natural gas stream 202 may undergo a water wash to remove glycol or other chemical additives. This may be accomplished via a separate processing loop (not shown) wherein water is introduced to the natural gas stream 202, such as via an additional co-current contacting system. Water has an affinity for glycol and will pull the glycol out of the natural gas stream 202. This, in turn, will help control foaming within the co-current contacting system 204. In the case of flue gas applications, corrosion inhibitors may be added to the solvent to retard the reaction of $O_2$ with the steel in the processes.

According to embodiments described herein, the gas treating solution 208 is flowed into the co-current contactor of the co-current contacting system 204. Once inside the co-current contactor, the natural gas stream 202 and the gas treating solution 208 may move along the longitudinal axis of the co-current contactor. As they travel, the gas treating solution 208 may interact with the impurities within the natural gas stream 202, causing the impurities to chemically attach to or be absorbed by the molecules within the gas treating solution 208. The natural gas stream 202 and the molecules of the gas treating solution 208 with the absorbed impurities may then be flowed into the separator of the co-current contacting system 204. The separator may remove the natural gas stream 202 from the molecules of the gas treating solution 208 with the absorbed impurities, forming the purified natural gas stream 206 and the partially-loaded gas treating solution 212.

The partially-loaded gas treating solution 212 may then be flowed out of a bottom portion of the co-current contacting system 204, and the purified natural gas stream 206 may be flowed out of a top portion of the co-current contacting system 204. In some examples, one portion of the partially-loaded gas treating solution 212 is recycled to the co-current contacting system 204, while another portion of the partially-loaded gas treating solution 212 is sent to the regenerator 214 to undergo a regeneration process. In various embodiments, recycling a portion of the partially-loaded gas treating solution 212 to the co-current contacting system 204 significantly improves the efficiency of the gas processing system 200 by lowering the solvent circulation rate and/or increasing the cyclic capacity of the system 200.

In the gas processing system 200, the portion of the partially-loaded gas treating solution 212 that is sent to the regenerator 214 may be flowed through a flash drum 220 to begin the regeneration process. Absorbed natural gas 222 may be flashed from the partially-loaded gas treating solution 212 within the flash drum 220, and may be flowed out of the flash drum 220 via an overhead line 224.

The resulting rich gas treating solution 226 may be flowed from the flash drum 220 to the regenerator 214. The rich gas treating solution 226 may be introduced into the regenerator 214 for desorption. The regenerator 214 may include a stripper portion 228 including trays or other internals (not shown). The stripper portion 228 may be located directly above a reboiler portion 230. A heat source 232 may be provided with the reboiler portion 230 to generate heat. The regenerator 214 may produce the regenerated, lean gas treating solution 210 that is recycled for re-use in the co-current contacting system 204. Stripped overhead gas from the regenerator 214, which may include concentrated $H_2S$ (or $CO_2$), may be flowed out of the regenerator 214 as an overhead impurities stream 234.

The overhead impurities stream 234 may be flowed into a condenser 236, which may cool the overhead impurities stream 234. The resulting cooled impurities stream 238 may be flowed through a reflux accumulator 240. The reflux accumulator 240 may separate any remaining liquid, such as condensed water, from the impurities stream 238. This may result in the generation of a substantially pure acid gas stream 242, which may be flowed out of the reflux accumulator 240 via an overhead line 244. In addition, a residual liquid stream 246 may be flowed out of the bottom of the reflux accumulator 240. The residual liquid stream 246 may be flowed through a reflux pump 248, which may boost the pressure of the residual liquid stream 246 and pump the residual liquid stream 246 into the regenerator 214. The residual liquid stream 246 may then be combined with the gas treating solution within the regenerator 214 and flowed out of the regenerator 214 as part of the lean gas treating solution 210.

The process flow diagram of FIG. 2A is not intended to indicate that the gas processing system 200 is to include all of the components shown in FIG. 2A. Further, any number of additional components may be included within the gas processing system 200, depending on the details of the specific implementation. For example, the gas processing system 200 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others. Moreover, the gas processing system 200 may include any number of additional co-current contacting systems, as discussed further with respect to FIGS. 2B and 2C.

Figure 2B:
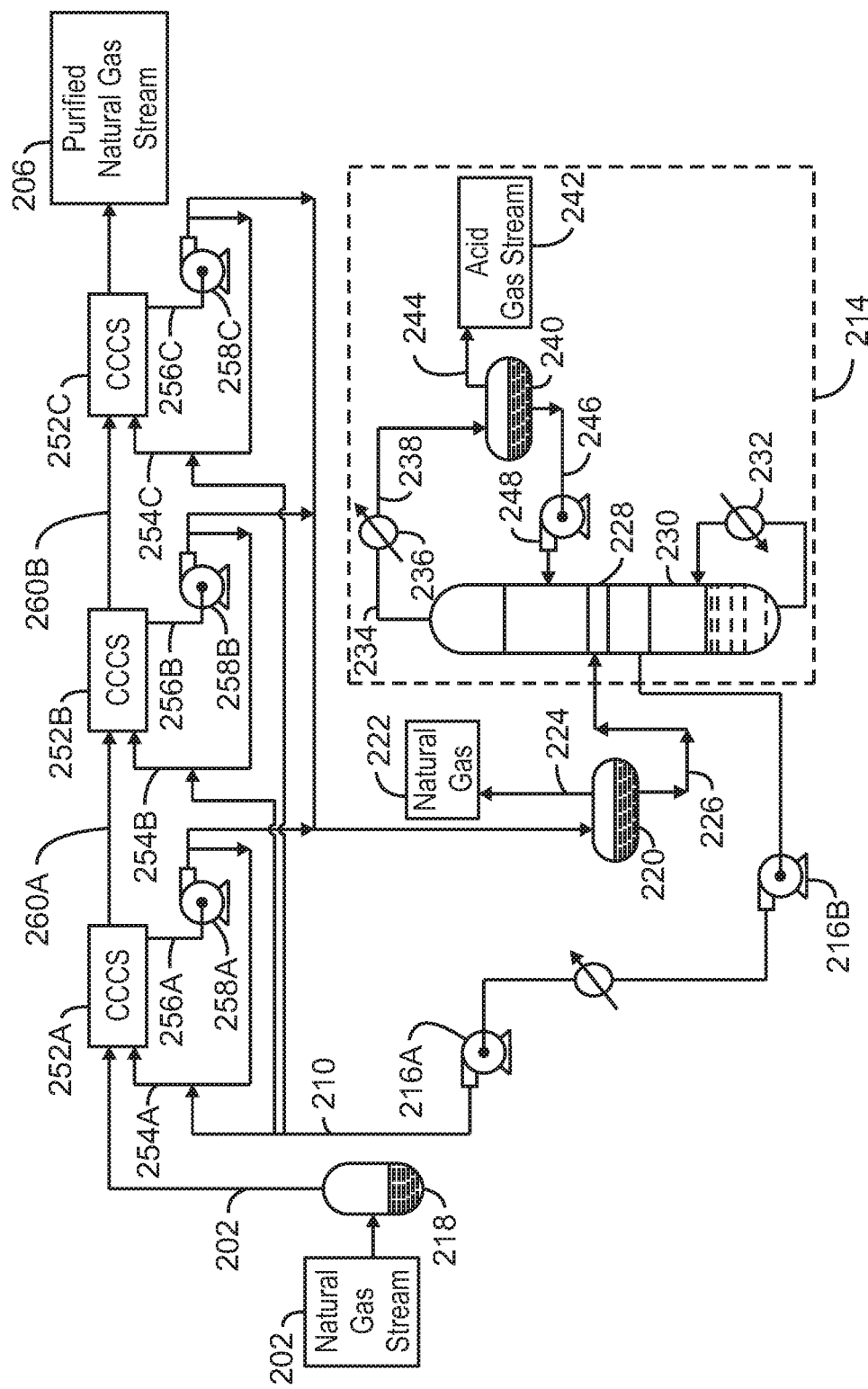
FIG. 2B is a process flow diagram of another gas processing system that includes a co-current flow scheme.

FIG. 2B is a process flow diagram of another gas processing system 250 that includes a co-current flow scheme. Like numbered items are as described with respect to FIG. 2A. Operation of the gas processing system 250 of FIG. 2B is similar to that of the gas processing system 200 of FIG. 2A. However, the gas processing system 250 of FIG. 2B includes a first, second, and third co-current contacting system 252A-C in place of the single co-current contacting system 204 of FIG. 2A. Each co-current contacting system 252A-C may remove a portion of the impurities from the natural gas stream 202, thereby releasing a progressively purified natural gas stream in a downstream direction. The third (and final) co-current contacting system 252C may provide the final purified natural gas stream 206.

According to the embodiment shown in FIG. 2B, the natural gas stream 202 may be flowed into the first co-current contacting system 252A, where it is contacted with a first gas treating solution 254A. In some examples, the first gas treating solution 254A is a mixture of the lean gas treating solution 210 and a first partially-loaded gas treating solution 256A. The first partially-loaded gas treating solution 256A may be gas treating solution that has undergone intra-stage recycling within the first co-current contacting system 252A. More specifically, the first partially-loaded gas treating solution 256A may be flowed out of the bottom of the first co-current contacting system 252A, combined with the lean gas treating solution 210, and then flowed back into the first co-current contacting system 252A with the aid of a pump 258A.

In various embodiments, the natural gas stream 202 and the first gas treating solution 254A may be co-currently flowed into the co-current contactor of the first co-current contacting system 252A. Once inside the co-current contactor, the natural gas stream 202 and the first gas treating solution 254A may move along the longitudinal axis of the contactor. As they travel, the first gas treating solution 254A may interact with the impurities within the natural gas stream 202, causing the impurities to chemically attach to or be absorbed by the molecules of the first gas treating solution 254A. The natural gas stream 202 and the molecules of the first gas treating solution 254A with the absorbed impurities may then be flowed into the separator of the first co-current contacting system 252A. The separator may remove the gas stream 202 from the molecules of the first gas treating solution 254A with the absorbed impurities, forming a first partially-purified natural gas stream 260A and the first partially-loaded gas treating solution 256A.

The first partially-loaded gas treating solution 256A may then be flowed out of a bottom portion of the first co-current contacting system 252A. One portion of the first partially-loaded gas treating solution 256A may then be recycled to the first co-current contacting system 252A, while another portion of the first partially-loaded gas treating solution 256A may be sent to the regenerator 214. In addition, the first partially-purified natural gas stream 260A may be flowed out of a top portion of the first co-current contacting system 252A and into the second co-current contacting system 252B.

Within the second co-current contacting system 252B, the first partially-purified natural gas stream 260A may be contacted with a second gas treating solution 254B. The second gas treating solution 254B may be a mixture of the lean gas treating solution 210 and a second partially-loaded gas treating solution 256B. The second partially-loaded gas treating solution 256B may be gas treating solution that has undergone intra-stage recycling within the second co-current contacting system 252B. More specifically, the second partially-loaded gas treating solution 256B may be flowed out of the bottom of the second co-current contacting system 252B, combined with the lean gas treating solution 210, and then flowed back into the second co-current contacting system 252B with the aid of a pump 258B.

In various embodiments, the first partially-purified natural gas stream 260A and the second gas treating solution 254B are flowed into the co-current contactor of the second co-current contacting system 252B. Once inside the co-current contactor, the first partially-purified natural gas stream 260A and the second gas treating solution 254B may move along the longitudinal axis of the co-current contactor. As they travel, the second gas treating solution 254B may interact with the impurities within the first partially-purified natural gas stream 260A, causing the impurities to chemically attach to or be absorbed by the molecules of the second gas treating solution 254B. The first partially-purified natural gas stream 260A and the molecules of the second gas treating solution 254B with the absorbed impurities may then be flowed into the separator of the second co-current contacting system 252B. The separator may remove the first partially-purified natural gas stream 260A from the molecules of the second gas treating solution 254B with the absorbed impurities, forming a second partially-purified natural gas stream 260B and a second partially-loaded gas treating solution 256B.

The second partially-loaded gas treating solution 256B may then be flowed out of a bottom portion of the second co-current contacting system 252B. In some embodiments, a portion of the second partially-loaded gas treating solution 256B is recycled to the second co-current contacting system 252B, while another portion of the second partially-loaded gas treating solution 256B is sent to the regenerator 214. In addition, the second partially-purified natural gas stream 260B may be flowed out of a top portion of the second co-current contacting system 252B and into the third co-current contacting system 252C.

Within the third co-current contacting system 252C, the second partially-purified natural gas stream 260B may be contacted with a third gas treating solution 254C. The third gas treating solution 254C may be a mixture of the lean gas treating solution 210 and a third partially-loaded gas treating solution 256C. The third partially-loaded gas treating solution 256C may be gas treating solution that has undergone intra-stage recycling within the third co-current contacting system 252C. More specifically, the third partially-loaded gas treating solution 256C may be flowed out of the bottom of the third co-current contacting system 252C, combined with the lean gas treating solution 210, and then flowed back into the third co-current contacting system 252C with the aid of a pump 258C.

In various embodiments, the second partially-purified natural gas stream 260B and the third gas treating solution 254C are flowed into the co-current contactor of the third co-current contacting system 252C. Once inside the co-current contactor, the second partially-purified natural gas stream 260B and the third gas treating solution 254C may move along the longitudinal axis of the co-current contactor. As they travel, the third gas treating solution 254C may interact with the impurities within the second partially-purified natural gas stream 260B, causing the impurities to chemically attach to or be absorbed by the molecules of the third gas treating solution 254C. The second partially-purified natural gas stream 260B and the molecules of the third gas treating solution 254C with the absorbed impurities may then be flowed into the separator of the third co-current contacting system 252C. The separator may remove the second partially-purified natural gas stream 260B from the molecules of the third gas treating solution 254C with the absorbed impurities, forming the purified natural gas stream 206 and a third partially-loaded gas treating solution 256C.

The third partially-loaded gas treating solution 256C may then be flowed out of a bottom portion of the third co-current contacting system 252C. One portion of the third partially-loaded gas treating solution 256C may then be recycled to the third co-current contacting system 252C, while another portion of the third partially-loaded gas treating solution 256C may be sent to the regenerator 214. In addition, the purified natural gas stream 206 may be flowed out of a top portion of the third co-current contacting system 252C as the final product of the gas processing system 250.

The process flow diagram of FIG. 2B is not intended to indicate that the gas processing system 250 is to include all of the components shown in FIG. 2B. Further, any number of additional components may be included within the gas processing system 250, depending on the details of the specific implementation. For example, the gas processing system 250 may include any number of additional co-current contacting systems, as discussed further with respect to FIG. 2C. Moreover, the gas processing system 250 may also employ inter-stage recycling of the gas treating solutions, as described further with respect to FIG. 2C.

Figure 2C:
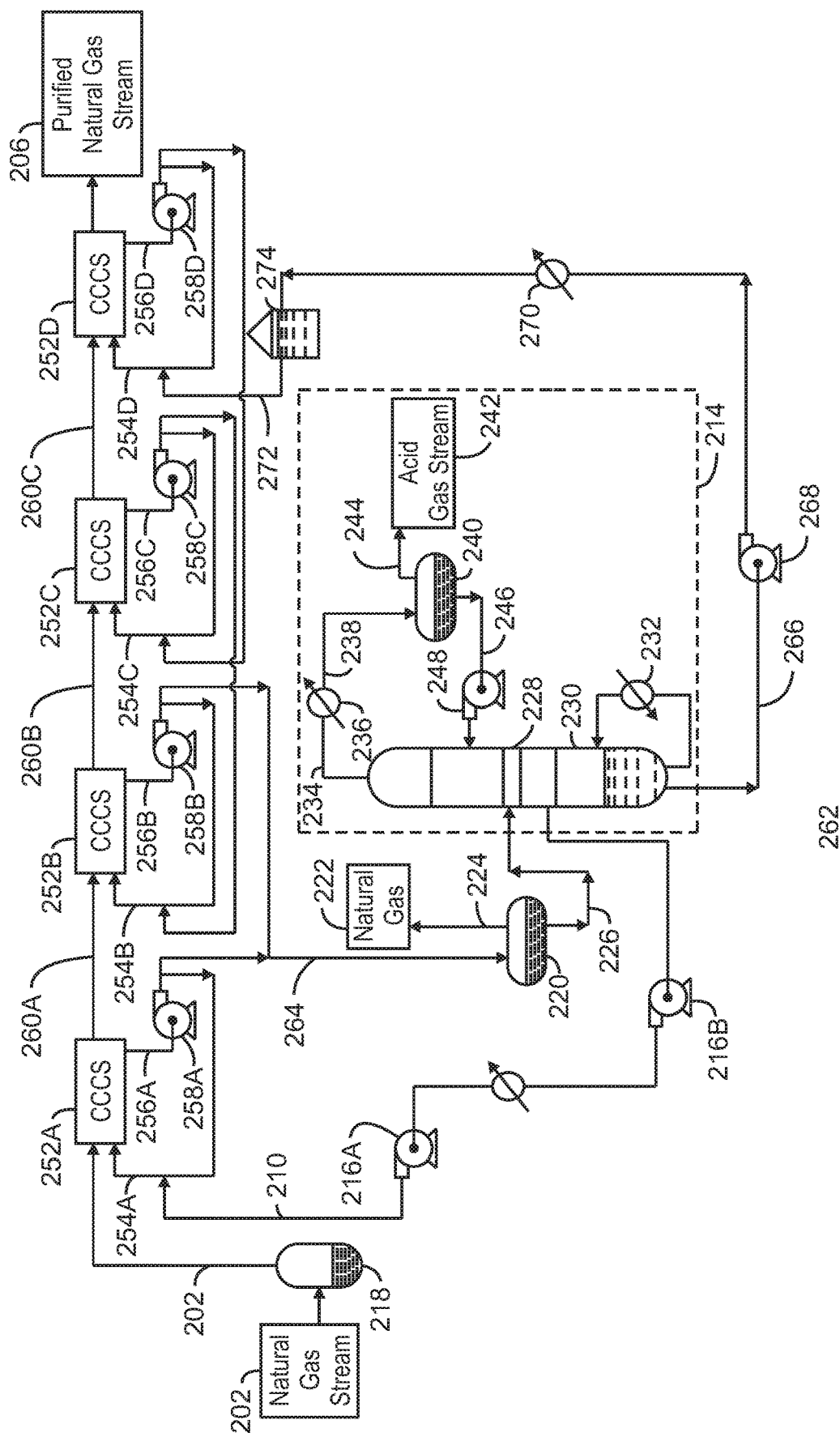
FIG. 2C is a process flow diagram of another gas processing system that includes a co-current flow scheme.

FIG. 2C is a process flow diagram of another gas processing system 262 that includes a co-current flow scheme. Like numbered items are as described with respect to FIGS. 2A and 2B. Operation of the gas processing system 262 of FIG. 2C is similar to that of the gas processing system 250 of FIG. 2B. However, the gas processing system 262 of FIG. 2C includes an additional co-current contacting system 252D, and the gas processing system 262 of FIG. 2C employs inter-stage recycling in addition to the intra-stage recycling shown in FIG. 2B.

According to the embodiment shown in FIG. 2C, each of the first, second, and third co-current contacting systems 252A-C generates a respective partially-purified natural gas stream 260A-C, and the fourth (and final) co-current contacting system 252D generates the final purified natural gas stream 206. In addition, each of the co-current contacting systems 252A-D may generate respective partially-loaded gas treating solution 256A-D. As shown in FIG. 2C, the second partially-loaded gas treating solution 256B may merge with the first partially-loaded gas treating solution 256A to form a semi-rich gas treating solution 264. The semi-rich gas treating solution 264 may then be sent through a regeneration process in the regenerator 214.

As described above with respect to FIGS. 2A and 2B, each of the co-current contacting system 252A-D may also provide for intra-stage recycling of the respective partially-loaded gas treating solutions 256A-D. More specifically, a portion of each partially-loaded gas treating solution 256A-D may be flowed out of the bottom of the respective co-current contacting system 252A-D and back to the front of the respective co-current contacting system 252A-D with the aid of a corresponding pump 258A-D.

Moreover, the third and fourth co-current contacting systems 252C and 252D may also provide for inter-stage recycling of the respective partially-loaded gas treating solutions 256C and 256D. This may be accomplished by flowing a portion of each partially-loaded gas treating solution 256C and 256D out of the bottom of the respective co-current contacting system 252C or 252D, and pumping the partially-loaded gas treating solution 256C or 256D back to the front of the previous co-current contacting system 252B or 252C. It may then be combined with the partially-loaded gas treating solution 256B or 256C from intra-stage recycling to form the second or third gas treating solution 254B and 254C, respectively. The second and third gas treating solutions 254B and 254C are then flowed into the respective co-current contacting systems 252B and 252C.

In various embodiments, as the progressively-purified natural gas streams 260A-C are generated, the gas pressure in the gas processing system 262 will gradually decrease. As this occurs, the liquid pressure of the progressively-richer gas treating solutions 256A-D may be correspondingly increased. This may be accomplished by placing booster pumps (not shown) between each co-current contacting system 252A-D to boost liquid pressure in the gas processing system 262.

Furthermore, according to the embodiment shown in FIG. 2C, a second lean gas treating solution 266 is flowed out of the regenerator 214, for example, from the bottom of the reboiler portion 230. Some water may be added to the second lean gas treating solution 266 to balance the loss of water vapor to the partially-purified gas streams 260A-C. This water may be added at an intake or suction of the reflux pump 248.

The second lean gas treating solution 266 may be at a low pressure. Accordingly, the second lean gas treating solution 266 may be passed through a pressure boosting pump 268. From the pressure boosting pump 268, the second lean gas treating solution 266 may be flowed through a cooler 270. The cooler 270 may cool the second lean gas treating solution 266 to ensure that the second lean gas treating solution 266 will absorb impurities effectively. The resulting chilled lean gas treating solution 272 may be then mixed with the fourth partially-loaded gas treating solution 256D to form the fourth gas treating solution 254D for use in the fourth co-current contacting system 252D.

In some embodiments, a tank 274 is provided proximate the fourth co-current contacting system 252D. The chilled lean gas treating solution 272 may be flowed from the tank 274. In other embodiments, the tank 274 is off-line and provides a reservoir for the chilled lean gas treating solution 272.

The process flow diagram of FIG. 2C is not intended to indicate that the gas processing system 262 is to include all of the components shown in FIG. 2C. Further, any number of additional components may be included within the gas processing system 262, depending on the details of the specific implementation. For example, the gas processing system 262 may include any number of additional co-current contacting systems.

In some embodiments, if the initial gas stream 202 includes $H_2S$, an $H_2S$-selective gas treating solution is used to capture the $H_2S$, with the resulting acid gas stream 242 primarily composed of $H_2S$. The $H_2S$ may then be converted into elemental sulfur using a sulfur recovery unit (not shown). The sulfur recovery unit may be a so-called Claus unit. Those of ordinary skill in the art will understand that a "Claus process" is a process that is sometimes used by the natural gas and refinery industries to recover elemental sulfur from $H_2S$-containing gas streams.

In practice, the "tail gas" from the Claus process, which may include $H_2S$, $SO_2$, $CO_2$, $N_2$ and water vapor, can be reacted to convert the $SO_2$ to $H_2S$ via hydrogenation. The hydrogenated tail gas stream has a high partial pressure, a large amount of $CO_2$, e.g., more than 50%, and a small amount of $H_2S$, e.g., a few percent or less. This type of gas stream, which is typically near atmospheric pressure, is amenable to selective $H_2S$ removal. The recovered $H_2S$ may be recycled to the front of the Claus unit, or may be sequestered downstream. Alternatively, a direct oxidation of the $H_2S$ to elemental sulfur may be performed using various processes known in the field of gas separation.

Because the $H_2S$ reaction is nearly instantaneous relative to the $CO_2$ reaction, lowering the residence time, i.e., the contact time between the vapor and liquid phases, will result in less $CO_2$ being absorbed into the solvent. The design of the co-current contacting systems 204 and 252A-D of FIGS. 2A-C enhances selective $H_2S$ removal due to the short contact time inherent in the equipment design.

Because the gas processing systems 200, 250, and 262 of FIGS. 2A-C use a co-current contacting scheme rather than a counter-current contacting scheme, they are capable of achieving a much lower solvent circulation rate than the conventional gas processing facility 100 of FIG. 1. More specifically, the inter-stage and intra-stage solvent recycling within the co-current contacting systems 204 and 252A-D allows for much higher solvent loading, particularly with respect to selective $H_2S$ removal. This increases the cyclic capacity of the system, i.e., allows for the absorption of a large amount of $H_2S$ with a minimal amount of solvent. As a result, in some embodiments, the total solvent circulation rate may be reduced within the system, and the intra-stage (and, optionally, inter-stage) solvent recycling may be used to maintain a constant solvent rate to each individual stage. In this configuration, the reduction of the solvent circulation rate saves energy and allows for the use of more compact equipment in the liquid circuit. For example, smaller regenerators, heat exchangers, pumps, and piping may be used. Moreover, in some embodiments, portable equipment is used, and the gas processing systems 200, 250 and 262 of FIGS. 2A-C may be mounted on a skid. For example, in some embodiments, the co-current contacting systems 204 and 252A-D of FIGS. 2A-C may be compact enough to transport using a skid, thus allowing the co-current contacting systems 204 and 252A-D to be used at multiple different locations.

In other embodiments, the total solvent circulation rate is held constant, and the intra-stage (and, optionally, inter-stage) solvent recycling is used to increase the liquid-to-gas ratio and, thus, increase the degree of $H_2S$ removal. Often, some combination of these two embodiments will be desirable.

The percentage of solvent recycled may vary from 0-99%, but will likely range from 10-30% in most cases. Moreover, the amount of solvent recycled may be adjusted to achieve the desired separation, adding flexibility to the design and operation of the gas processing systems 200, 250 and 262 of FIGS. 2A-C.

The effectiveness of this system at removing $H_2S$ from a natural gas stream can be explored and quantified using a process simulator to estimate the system's performance. Tables 1 and 2 include results from a simulation test performed in ProTreat® (available from Optimized Gas Treating, Inc.), using ExxonMobil's Compact Mass Transfer and Inline Separation Technology (cMIST™) operation as a basis comparison. In the cMIST operation, the inlet gas contains approximately 2.4% $CO_2$ and 130 ppm $H_2S$, and a 50 wt. % MDEA solvent is used. A typical parallel configuration uses 10 gallons/minute (gal/min) of solvent per stage to treat 10 million standard cubic feet per day (MMscfd) of sour gas. The first stage outlet gas contains 2.4% $CO_2$ and 30 ppm $H_2S$. A mass balance shows that the solvent loading increase from 0.003 mol/mol to a rich loading of 0.005 mol/mol. This is a very low cyclic capacity per stage. A configuration that would increase cyclic capacity could allow significant energy reduction for the overall $H_2S$ removal process.

The ProTreat® simulation results shown in Tables 1 and 2 were found to reasonably represent plant operation. In the first study, a single stage co-current contacting system with intra-stage recycling was used. It was modeled with 10 MMscfd of gas with 2.46% $CO_2$ and 135 ppm $H_2S$. The results are shown in Table 1. The solvent circulation rate was reduced by up to 30% with only minor degradation in performance, i.e., a 3% drop in $H_2S$ removal. The slight degradation in performance was due to the slight increase in total lean loading being fed to the separation stage of the co-current contacting system. There was no impact on $CO_2$ removal. Moreover, improved separation efficiency was achieved when the total circulation rate was held constant and intra-stage recycling was employed.

TABLE 1

Single Stage Co-Current Contactor Simulation

| Recycle (%) | Total Circulation (gpm) | Outlet $CO_2$ (%) | Outlet $H_2S$ (ppm) | Outlet Liquid Loading (mol/mol) | % $H_2S$ Removal |
|---|---|---|---|---|---|
| 0 | 10 | 2.41 | 40.9 | 0.022 | 69.7 |
| 10 | 9 | 2.41 | 42.1 | 0.024 | 68.8 |
| 20 | 8 | 2.42 | 43.6 | 0.025 | 67.7 |
| 30 | 7 | 2.42 | 45.1 | 0.028 | 66.6 |
| 30 | 10 | 2.41 | 36.9 | 0.023 | 72.7 |

In the second study, a similar simulation was performed on a three-stage processing system, i.e., a processing system including three co-current contacting systems. Identical recycle loops were used on the first two stages only. The results are shown in Table 2. As in the single stage case, the solvent circulation rate could be reduced with only a small impact on performance. The simulation results show that a 20% reduction in the total solvent circulation rate causes a less than 1% decrease in $H_2S$ removal. Moreover, the $H_2S$ removal can be increased by maintaining a constant solvent circulation rate. As in the single stage scenario, there was no impact on $CO_2$ removal.

These simulation results illustrate the effectiveness of the gas processing systems 200, 250, and 262 of FIGS. 2A-C at selectively removing $H_2S$ with greater efficiency than conventional gas processing facilities. The use of co-current contacting systems allows for the use of more compact equipment in the liquid circuit and lowers the overall energy demands for acid gas removal. Furthermore, the simulation results show that the use of intra-stage solvent recycling within co-current contacting systems further improves the cyclic capacity of the system, thereby allowing for a lower solvent circulation rate and/or increased acid gas removal.

TABLE 2

Three Stage Co-Current Contactor Simulation

| Recycle in Stage 1 and 2 (%) | Total Circulation (gpm) | Outlet $CO_2$ (%) | Outlet $H_2S$ (ppm) | Outlet Liquid Loading (mol/mol) | % $H_2S$ Removal |
|---|---|---|---|---|---|
| 0 | 30 | 2.36 | 3.08 | 0.022 | 97.7 |
| 20 | 26 | 2.36 | 3.46 | 0.024 | 97.4 |
| 25 | 24 | 2.36 | 3.82 | 0.025 | 97.2 |
| 20 | 30 | 2.36 | 2.82 | 0.028 | 97.9 |
| 25 | 30 | 2.36 | 2.76 | 0.023 | 98.0 |

Figure 3:
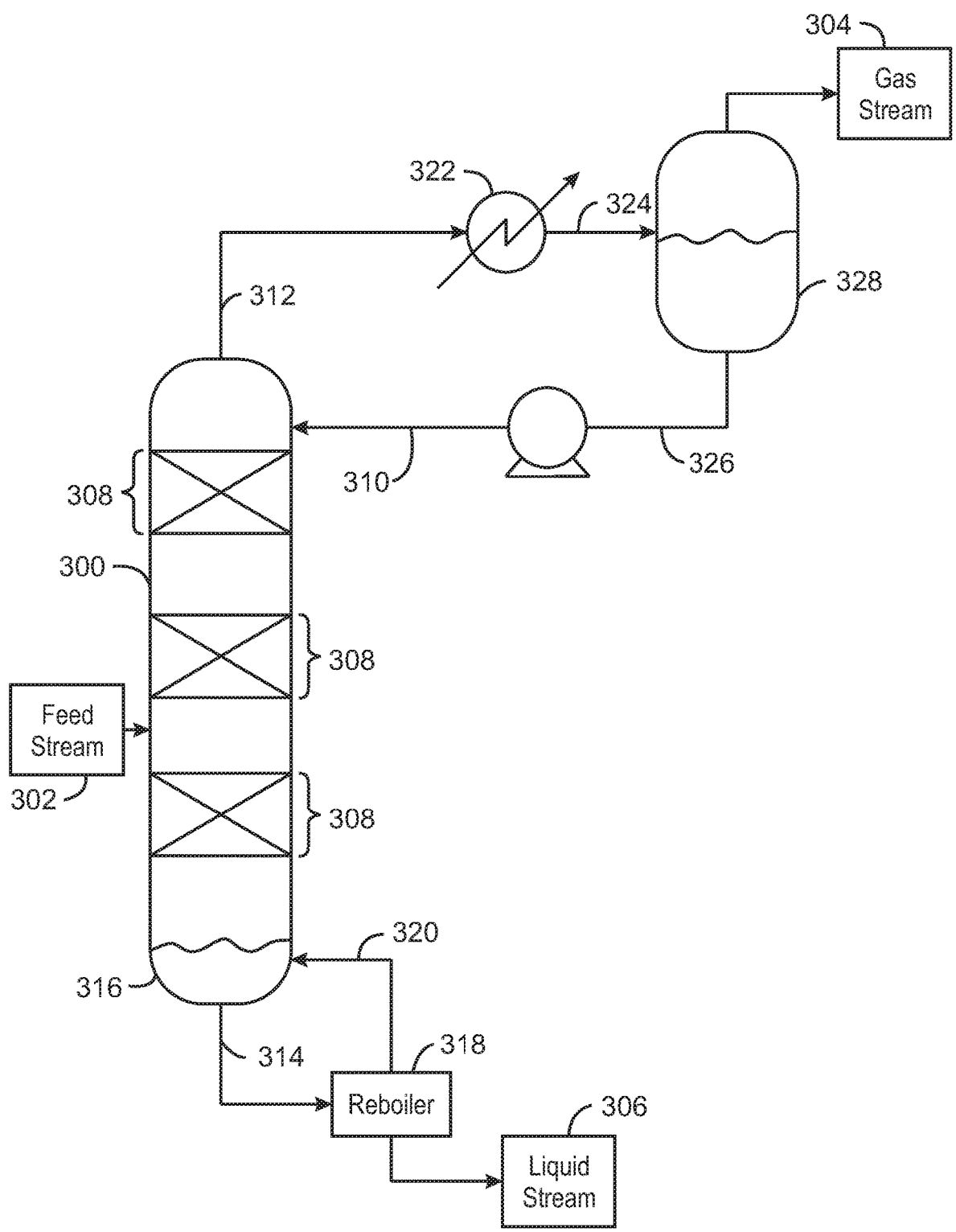
FIG. 3 is a schematic of a conventional column for separating a feed stream into a gas stream and a liquid stream.

FIG. 3 is a schematic of a conventional column 300 for separating a feed stream 302 into a gas stream 304 and a liquid stream 306. The feed stream 302 may be a gas stream that includes two or more different components with different boiling points and vapor pressures, such as an absorbent solvent and a gas contaminant. The column 300 may be the same as, or similar to, the contactor 106 described with respect to the gas processing facility 100 of FIG. 1.

The column 300 may include a number of trays 308 or other internals that create indirect flow paths for the feed stream 302 and create interfacial area between the gas and liquid phases. The feed stream 302 may be injected into a lower or middle portion of the column 300, between the trays 308. The gas within the feed stream 302 may move upward through the column 300. At the same time, any liquid within the column 300 moves downward and across the succession of trays 308 in the column 300. In addition, the liquid may include a reflux stream 310 that is reinjected into the top portion of the column 300, as discussed further herein.

The column 300 may utilize a variety of separation technologies, depending on the species in the feed stream 302. For example, the column may be a distillation column, a countercurrent separation column, or a regeneration column, among others.

For a distillation column, the feed stream 302 may include a mixture of liquids with slightly different boiling points. In this case, the column 300 is a distillation column that functions to separate the species by the differences in boiling point. The trays 308 determine the number of theoretical plates, and, thus, the separation efficiency of the column 300.

In a countercurrent column, the feed stream 302 may include a mixture of gases, such as methane and $H_2O$ or $H_2S$. As the gases flow upwards through the falling stream of liquid, one gas species is preferentially absorbed by the liquid, lowering its concentration in the gas rising to the top of the column 300. In some embodiments, the liquid includes a physical solvent (not shown) that is injected into a top portion of the column 300. More specifically, the liquid and vapor phases may be counter-currently contacted to effect separation of a fluid mixture based on chemical affinities, boiling point difference, or vapor pressure differences, or combinations thereof.

In a regeneration column, the feed stream 302 includes a liquid that contains a dissolved or adsorbed gas. As the liquid falls through the column 300, the gas is released, and exits through the top.

The component that concentrates in the gas phase may be flowed out of the top of the column 300 as an overhead gas stream 312, while the component that concentrates in the liquid phase may be flowed out of the bottom of the column 300 as a bottoms liquid stream 314. In addition, some amount of liquid 316 may be allowed to collect in the bottom of the column 300 before being flowed out of the column 300 in order to provide for increased separation of the gas phase from the liquid phase.

The bottoms liquid stream 314 may be flowed through a reboiler 318. The reboiler 318 may increase the temperature of the bottoms liquid stream 314, vaporizing a portion of the bottoms liquid stream 314, which may include components in the liquid, or a portion of the liquid itself. The resulting stream 320 may be flowed back into the bottom portion of the column 300 to provide heat to the liquids 316 collecting in the bottom of the column 300.

A portion of the overhead gas stream 312 may be cooled and at least partially condensed within a heat exchanger 322. The cooled gas stream 324 may then be separated into the gas stream 304 and a liquid stream 326 within a separation column 328. The liquid stream 326 may be pumped back into the top portion of the column 300 as the reflux stream 310. Within the column 300, the reflux stream 310 may be used to enhance the performance of the column 300 by increasing the degree of separation between the liquid phase and the gas phase.

In practice, the column 300 may be very large and heavy. This may create difficulty in many applications, such as offshore oil and gas production applications. Therefore, the co-current contacting system described herein may provide a desirable alternative to the column 300.

Figure 4A:
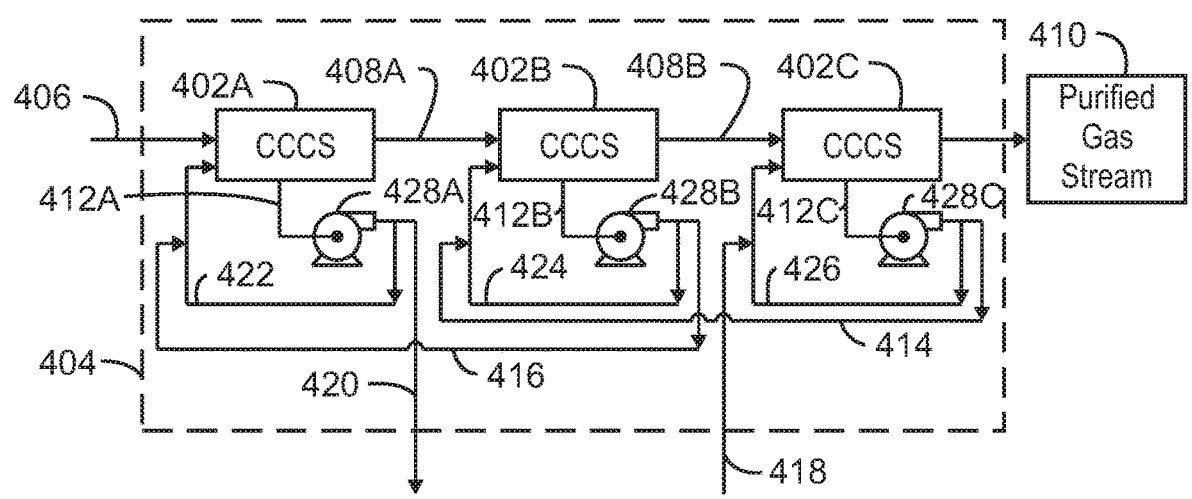
FIG. 4A is a process flow diagram of a gas purification system including a number of co-current contacting systems that may be placed in a shell.

FIG. 4A is a process flow diagram of a gas purification system 400 including a number of co-current contacting systems 402A-C that may be placed in a shell 404. In this embodiment, the gas purification system 400 is analogous to a separation column, for example, as discussed with respect to FIG. 3, in which each of the co-current contacting systems 402A-C are acting as bed packing. In some embodiments, the shell 404 is a permanent, climate-controlled structure. In other embodiments, the shell 404 is a temporary or portable structure. In other embodiments, the shell 404 is an insulated jacket. The gas purification system 400 may be implemented as part of a gas processing system, such as any of the gas processing systems 200, 250, or 262 discussed with respect to FIGS. 2A-C. The gas processing system may utilize a number of co-current contacting systems connected in series, such as the co-current contacting systems 252A-D discussed with respect to FIGS. 2B and 2C. In the illustrative arrangement shown in FIG. 4A, a first co-current contacting system 402A, a second co-current contacting system 402B, and a third co-current contacting system 402C are provided, each residing within the single shell 404.

In various embodiments, due to the pump requirements on the liquid streams, the inter-stage liquid streams may be flowed through the shell 404. The shell 404 may be designed to keep the equipment and the solvent solutions flowing therein cool. This may be done through climate control within the shell 404 or through the circulation of a cooling medium adjacent to the shell 404.

A first gas stream 406 may be flowed into the first co-current contacting system 402A. The first co-current contacting system 402A may generate a first partially-purified gas stream 408A, which may be flowed from the first co-current contacting system 402A to the second co-current contacting system 402B. The second co-current contacting system 402B may then generate a second partially-purified gas stream 408B, which may be flowed from the second co-current contacting system 402B to the third co-current contacting system 402C. In some embodiments, the third co-current contacting system 402C generates a final purified gas stream 410.

Each of the first, second, and third co-current contacting systems 402A-C also generates a respective partially-loaded gas treating solution 412A, 412B, and 412C. A portion 414 of the third partially-loaded gas treating solution 412C may be directed back to the second co-current contacting system 402B, and a portion 416 of the second partially-loaded gas treating solution 412B may be directed back to the first co-current contacting system 402A. This process may be referred to as "inter-stage solvent recycling."

In addition, the third co-current contacting system 402C may receive a gas treating solution 418 from another source. Further, a portion 420 of the first partially-loaded gas treating solution 412A may be returned to a regenerator (not shown), such as the regenerator 214 discussed with respect to FIGS. 2A-C, or may serve as a liquid solvent for a preceding co-current contacting system (not shown). In various embodiments, the gas treating solution 418 received by the third co-current contacting system 402C is a regenerated semi-lean gas treating solution generated from the portion 420 of the first partially-loaded gas treating solution 412A exiting the first co-current contacting system 402A.

According to embodiments described herein, each co-current contacting system also reuses a portion of its own gas treating solution via "intra-stage recycling." More specifically, a portion 422 of the first partially-loaded gas treating solution 412A is directed back to the front of the first co-current contacting system 402A, where it may be combined with the portion 416 of the second partially-loaded gas treating solution 412B before flowing back through the first co-current contacting system 402A. A portion 424 of the second partially-loaded gas treating solution 412B is directed back to the front of the second co-current contacting system 402B, where it may be combined with the portion 414 of the third partially-loaded gas treating solution 412C before flowing back through the second co-current contacting system 402B. Moreover, a portion 426 of the third partially-loaded gas treating solution 412C is directed back to the front of the third co-current contacting system 402C, where it may be combined with the gas treating solution 418 before flowing back through the third co-current contacting system 402C.

Furthermore, as shown in FIG. 4A, the movement of the first, second, and third partially-loaded gas treating solutions 412A-C may be aided by a first, second, and third pump 428A-C. The pumps 428A-C may increase the pressure of partially-loaded gas treating solutions 412A-C, which may help to overcome the effect of the pressure drop that occurs within the co-current contacting systems 402A-C. Increasing the pressure of the partially-loaded gas treating solutions 412A-C may also allow the gas treating solutions 412A-C to more effectively entrain the acid gases within the first gas stream 406.

The number of co-current contacting systems is not limited to that shown. Further, the interconnections do not have to be arranged as shown. In other applications, the co-current contacting systems may be used as reactors, for example, by including a reactant in the first gas stream 406, and injecting a second reactant in the respective partially-loaded gas treating solutions 412A, 412B, and 412C.

Figure 4B:
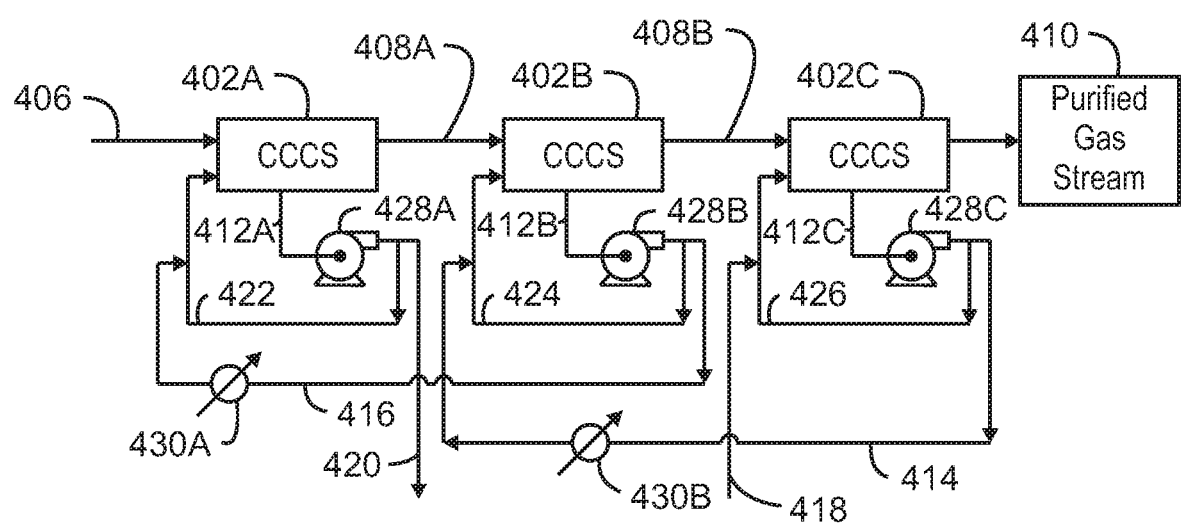
FIG. 4B is a process flow diagram of the co-current contactors of FIG. 4A with the addition of a number of heat exchangers.

FIG. 4B is a process flow diagram of the co-current contacting systems 402A, 402B, and 402C of FIG. 4A with the addition of a number of heat exchangers 430A and 430B. Like numbered items are as described with respect to FIG. 4A. The heat exchangers 430A and 430B may be used to cool the portions 416 and 414 of the second and third partially-loaded gas treating solutions 412B and 412C before they are recycled to the first and second co-current contacting systems 402A and 402B, respectively. In some embodiments, the heat exchangers 430A and 430B are used as an alternative to the use of the shell 404.

Figure 4C:
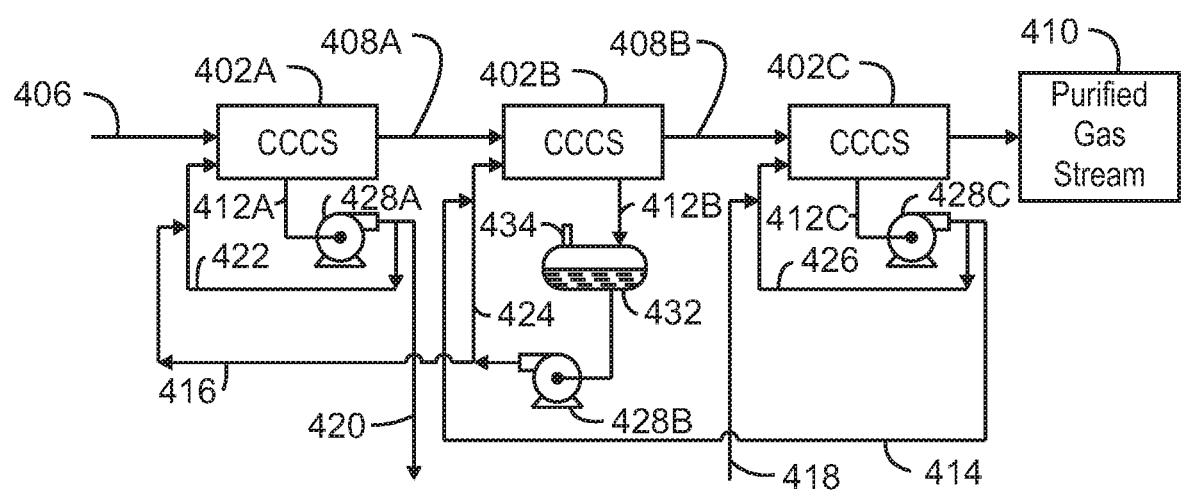
FIG. 4C is a process flow diagram of the co-current contacting systems of FIG. 4A with the addition of a flash drum.

FIG. 4C is a process flow diagram of the co-current contacting systems 402A, 402B, and 402C of FIG. 4A with the addition of a flash drum 432. Like numbered items are as described with respect to FIGS. 4A and 4B. As shown in FIG. 4C, the second partially-loaded gas treating solution 412B may be flowed through the flash drum 432. A flash line 434 may be provided coming off the top of the flash drum 432. The flash drum 432 and associated flash line 434 may permit methane and any $CO_2$ absorbed in the second partially-loaded gas treating solution 412B to be flashed out before the second partially-loaded gas treating solution 412B is recycled to the first and second co-current contacting systems 402A and 402B. $H_2O$ in vapor form may also be vented from the flash line 434. In various embodiments, flashing the second partially-loaded gas treating solution 412B creates a semi-lean solvent solution. The use of a semi-lean solvent solution in the first and second co-current contacting systems 402A and 402B may improve the efficiency of the co-current contacting systems 402A and 402B and reduce the load on the regenerator (not shown). Further, any of the other partially-loaded gas treating solutions 412A and 412C may also be flowed through a flash drum that is similar to the flash drum 432.

In some embodiments, gas, e.g., methane, $CO_2$, and $H_2O$, flashing out of the flash line 434 is merged with gas flashing out of flash lines associated with any number of other flash drums within the gas processing system. For example, for the gas processing systems 200, 250, and 262 discussed with respect to FIGS. 2A-C, the gas flashing out of the flash line 434 may be merged with the natural gas 222 flashing out of the flash drum 220. The pressure of the gas flashing out of the flash line 434 may correspond to the pressure of the natural gas 222 flashing out of the flash drum 220.

The use of co-current contacting systems has been described herein in connection with the removal of acid gases from a natural gas stream. For example, FIGS. 2A-C show applications wherein the concentration of $H_2S$ (or any other type of acid gas) within the natural gas stream is sequentially lowered through the use of co-current contacting systems. However, the gas processing systems 200, 250, and 262, as well any other type of gas processing system that includes co-current contacting systems, may also be used for a variety of other applications.

In some embodiments, the co-current contacting systems described herein are used for the dehydration of natural gas. Raw natural gas is often saturated with water. The water is typically removed to avoid the formation of natural gas hydrates and to prevent corrosion in pipelines.

In known operations, dehydration is commonly accomplished by contacting the wet gas stream with a glycol solvent. The glycol solvent is typically triethylene glycol (TEG). Contacting takes place in a trayed tower or a packed absorber. In operation, lean TEG, e.g., TEG that is substantially free of water, enters the top of the contactor, while the wet gas enters near the bottom of the tower. The two fluid streams flow counter-currently through the column. The downward-flowing TEG absorbs water from the upward-flowing natural gas. The natural gas exits the top of the column substantially dry, while the rich TEG exits the bottom of the column, containing the absorbed water.

Co-current contacting systems, such as the co-current contacting systems discussed with respect to FIGS. 2A-C and 4A-C, may be used in place of the trayed tower or packed absorber for rapidly contacting a desiccant with wet gas. In addition, higher pressure drops may be used to disperse the liquid solvent in the vapor phase and improve the efficiency of the co-current contacting systems.

In some embodiments, co-current contacting systems are used for the distillation of hydrocarbon mixtures or crude oil into near pure components. In such embodiments, the solvent may be steam or heated kerosene, and the gas phase may be methane and/or ethane. In addition, the hydrocarbon mixture may be heated to facilitate phase separation across the co-current contacting systems.

Co-current contacting systems connected in series may also be used for flash gas conditioning. In high-pressure gas purification processes, e.g. acid gas removal processes and dehydration processes, the rich solvent is often flashed into a vessel at a pressure in the range of 100 to 150 psig, for example. This flash stage releases much of the physically absorbed methane, but also releases some of the absorbed contaminants, such as $H_2S$, $CO_2$, and water vapor. To meet fuel gas specifications, this stream is often recontacted with a small slip-stream of lean solvent.

To remove impurities from the gas, a number of co-current contacting systems connected in series may be employed as absorbers. Only two or three stages may be used to remove the impurities, as the $H_2S$ specification for flash gas is generally not as stringent as that for pipeline gas. The flash gas may be used as fuel gas within a gas processing system, such as the gas processing system 200, 250, or 262 of FIG. 2A, 2B, or 2C, respectively, instead of being sold commercially.

In some embodiments, the gas stream represents gas from a catalytic hydro-desulfurization process (CHDS). In oil refineries, CHDS is sometimes used to convert mercaptans, sulfides, thiophenes, and other sulfur-containing compounds to $H_2S$. As an incidental byproduct of the CHDS, light hydrocarbons may be produced. It is possible to treat this gas to remove the $H_2S$, and then use the treated gas as fuel, for example. Such treatment may be accomplished using co-current contacting systems, such as the co-current contacting systems discussed with respect to FIGS. 2A-C and 4A-C.

A number of techniques have been demonstrated herein for sequentially removing acid gases from a natural gas stream by using co-current contacting systems. Some of the techniques described herein involve the removal of acid gases, either partially or completely, and either selectively or non-selectively, from hydrocarbon gas streams. The gas stream may be a natural gas stream, a combustion exhaust gas stream, or a refining gas stream, for example. The absorbent liquid may include an absorption solution including at least one chemical compound such as monoethanolamine (MEA), diglycolamine (DGA), diethanolamine (DEA), methyldiethanolamine (MDEA), 2-amino-2-methyl-1-propanol (AMP), piperazine (PZ), ammonia, amines, alkanolamines, their derivatives, and other chemical solvents and/or mixtures thereof. The absorbent liquid may also include at least one chemical component such as kinetic enhancers, corrosion inhibitors, anti-foam chemicals, oxygen scavengers, salts, neutralizers, anti-fouling chemicals, and anti-degradation chemicals.

The absorbent liquid may include at least one chemical component selected for absorbing, assimilating, or otherwise reacting with a gas, such as $CO_2$, $H_2S$, $SO_2$, and $NO_x$. Alternatively, the absorbent liquid may include a desiccating liquid including at least one chemical compound such as monoethylene glycol (MEG), diethylene glycol (DEG), or triethylene glycol (TEG).

In some embodiments, the gas purification system 400 of FIGS. 4A-C includes portable equipment mounted on a steel frame, or skid, for easy transport to and from any number of onshore or offshore locations. The skid may include steel beams that provide for the easy loading and unloading of the gas purification system 400 onto and off of the skid. This may be particularly useful for shale gas production operations, which frequently take place in remote locations.

Co-Current Contacting System

Figure 5:
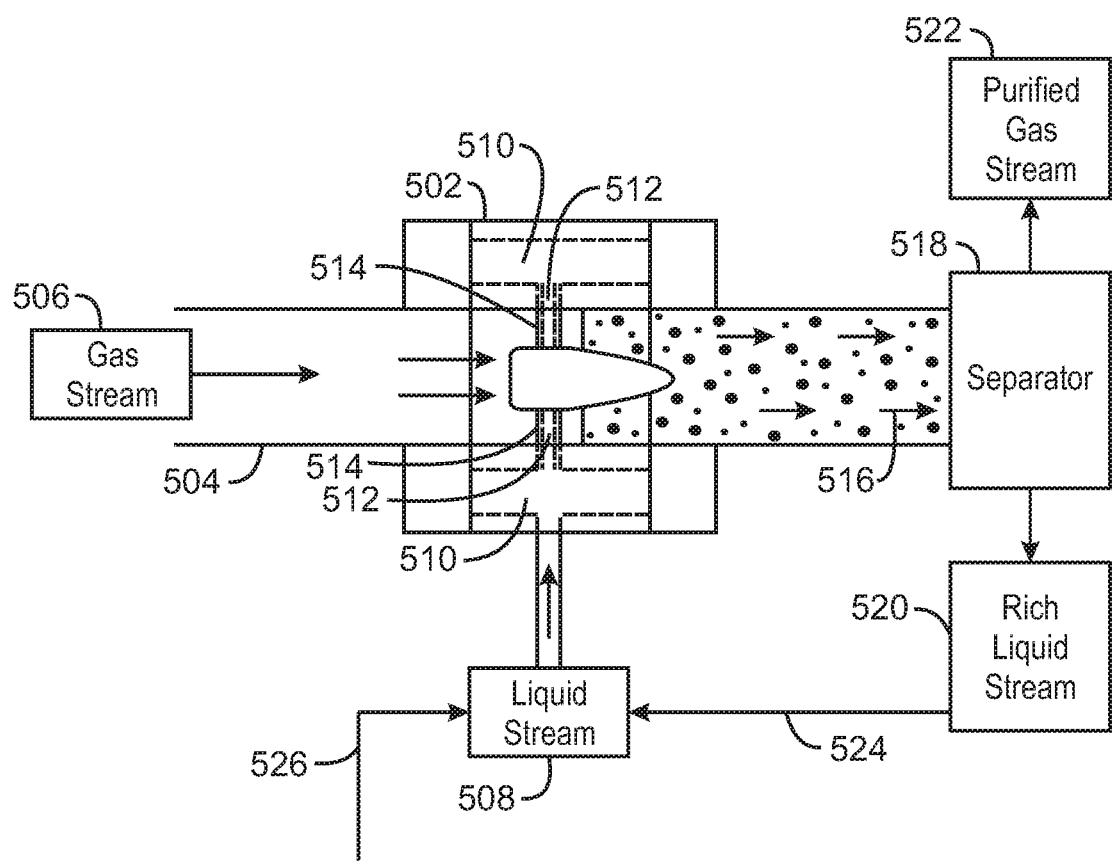
FIG. 5 is a schematic of a co-current contacting system with intra-stage solvent recycling.

FIG. 5 is schematic of a co-current contacting system 500 with intra-stage solvent recycling. The co-current contacting system 500 may provide for the separation of components within a gas stream. In addition, the co-current contacting system 500 may aid in the implementation of various gas processing systems, such as the gas processing systems 200, 250, and 262 of FIGS. 2A-C, where the rapid separation of components is desired. In some embodiments, the co-current contacting system 500 is one of the co-current contacting systems 204, 252A-D or 402A-C discussed with respect to FIGS. 2A-C and 4A-C.

The co-current contacting system 500 may include a co-current contactor 502 that is positioned in-line within a pipe 504. The co-current contactor 502 may include a number of components that provide for the efficient contacting of a liquid droplet stream with a flowing gas stream 506. The liquid droplet stream can be used for the separation of impurities, such as $H_2S$, from the gas stream 506.

As shown in FIG. 5, the gas stream 506 may be flowed through the pipe 504 and into the co-current contactor 502. A liquid stream 508 may also be flowed into the co-current contactor 502, for example, into a hollow space 510 coupled to flow channels 512 in the co-current contactor 502. The liquid stream 508 may include any type of treating liquid that is capable of removing impurities from the gas stream 506.

From the flow channels 512, the liquid stream 508 is released into the gas stream 506 as fine droplets through injection orifices 514, resulting in a treated gas stream 516. The treated gas stream 516 may include small liquid droplets dispersed in a gas phase. The liquid droplets may include impurities from the gas stream 506 that were absorbed or dissolved into the liquid stream 508.

The treated gas stream 516 may be flowed into a separator 518, such as a cyclonic separator, a mesh screen, or a settling vessel. The separator 518 may remove the liquid droplets from the gas phase. The liquid droplets with the incorporated impurities may exit the separator 518 as a rich liquid stream 520, and the gas phase may exit the separator 518 as a purified gas stream 522. In some embodiments, the purified gas stream 522 is a sweetened gas stream that has been purified via the removal of acid gas, such as $H_2S$. In other embodiments, the purified gas stream 522 is a dehydrated gas stream that has been purified via the removal of $H_2O$.

According to embodiments described herein, the liquid stream 508 flowing into the co-current contactor 502 includes a portion 524 of the rich liquid stream 520 that is returned to the co-current contactor 502 via intra-stage recycling. Furthermore, the liquid stream 508 flowing into the co-current contactor 502 may include an additional liquid stream 526. The additional liquid stream 526 may be a lean liquid stream that is substantially free of impurities, or it may be another rich liquid stream that is sent to the co-current contactor 502 from a subsequent co-current contactor via inter-stage recycling, as discussed further with respect to FIG. 6.

Figure 6:
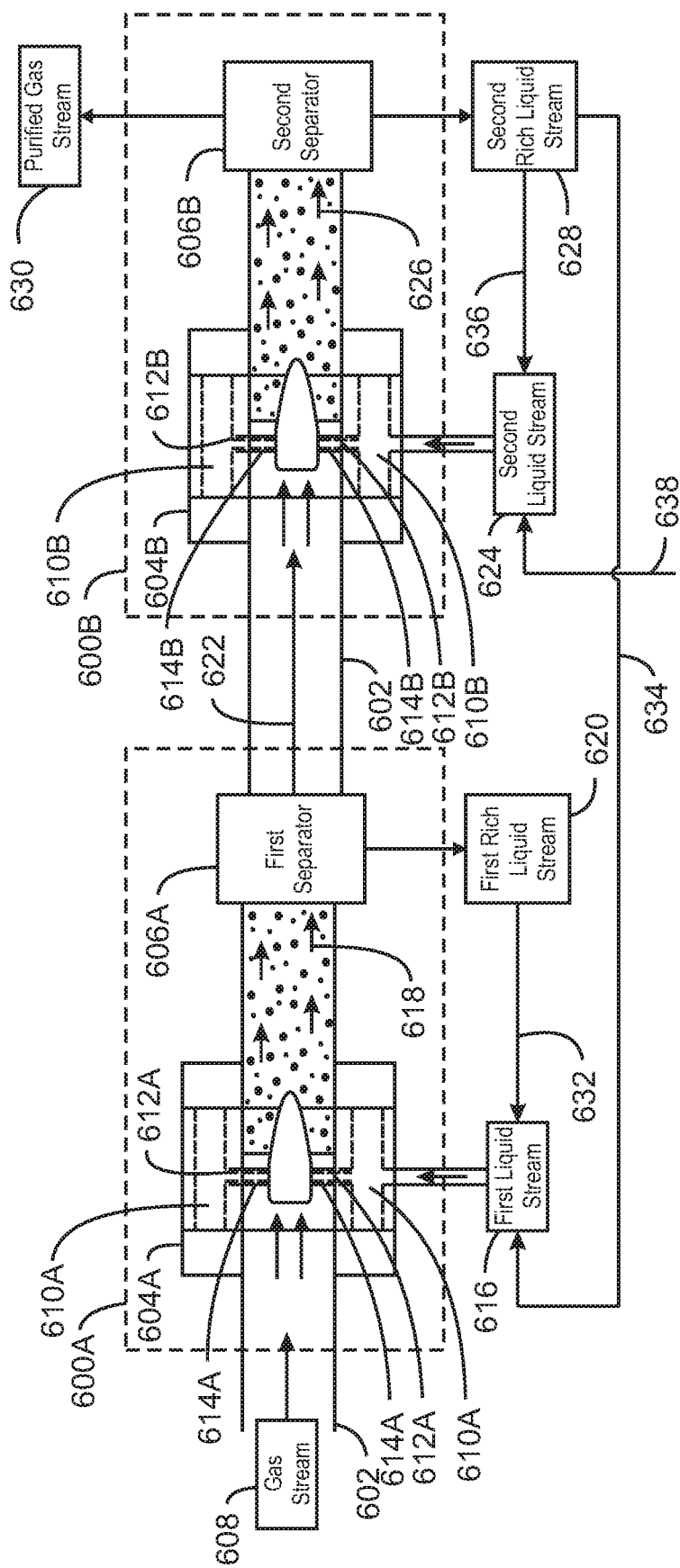
FIG. 6 is a schematic of two co-current contacting systems with intra-stage and inter-stage solvent recycling.

FIG. 6 is a schematic of two co-current contacting systems 600A and 600B with intra-stage and inter-stage solvent recycling. The co-current contacting systems 600A and 600B may provide for the separation of components within a gas stream. In addition, the co-current contacting systems 600A and 600B may aid in the implementation of various gas processing systems, such as the gas processing systems 200, 250, and 262 of FIGS. 2A-C, where the rapid separation of components is desired. In some embodiments, the co-current contacting systems 600A and 600B are two of the co-current contacting systems 204, 252A-D, or 402A-C discussed with respect to FIGS. 2A-C and 4A-C.

The co-current contacting systems 600A and 600B may be connected in series within a pipe 602. The co-current contacting systems 600A and 600B may each include a co-current contactor 604A and 604B and a separator 606A and 606B positioned in-line within the pipe 602. The co-current contactors 604A and 604B may each include a number of components that provide for the efficient contacting of a liquid droplet stream with a flowing gas stream 608, allowing for the separation of impurities, such as $H_2S$, from the gas stream 608. For example, each co-current contactor 604A and 604B may include a hollow space 610A and 610B, flow channels 612A and 612B, and injection orifices 614A and 614B.

As shown in FIG. 6, the gas stream 608 may be flowed through the pipe 602 and into the first co-current contactor 604A. A first liquid stream 616 may also be flowed into the first co-current contactor 604A, for example, into the hollow space 610A coupled to the flow channels 612A in the first co-current contactor 604A. The first liquid stream 616 may include any type of treating liquid that is capable of removing impurities from the gas stream 608.

From the flow channels 612A, the first liquid stream 616 may be released into the gas stream 608 as fine droplets through the injection orifices 614A, resulting in a first treated gas stream 618. The first treated gas stream 618 may include small liquid droplets dispersed in a gas phase. The liquid droplets may include impurities from the gas stream 608 that were absorbed or dissolved into the first liquid stream 616.

The first treated gas stream 618 may be flowed into the first separator 606A. The first separator 606A may remove the liquid droplets from the gas phase. The liquid droplets with the incorporated impurities may exit the first separator 606A as a first rich liquid stream 620, and the gas phase may exit the first separator 606A as a partially-purified gas stream 622.

The partially-purified gas stream 622 may then be flowed through the pipe 602 and into the second co-current contactor 604B. A second liquid stream 624 may also be flowed into the second co-current contactor 604B, for example, into the hollow space 610B coupled to the flow channels 612B in the second co-current contactor 604B.

From the flow channels 612B, the second liquid stream 624 may be released into the partially-purified gas stream 622 as fine droplets through the injection orifices 614B, resulting in a second treated gas stream 626. The second treated gas stream 626 may include small liquid droplets dispersed in a gas phase. The liquid droplets may include impurities from the partially-purified gas stream 622 that were absorbed or dissolved into the second liquid stream 624.

The second treated gas stream 626 may be flowed into the second separator 606B. The second separator 606B may remove the liquid droplets from the gas phase. The liquid droplets with the incorporated impurities may exit the second separator 606B as a second rich liquid stream 628, and the gas phase may exit the second separator 606B as a purified gas stream 630.

According to embodiments described herein, the first liquid stream 616 flowing into the first co-current contactor 604A includes a portion 632 of the first rich liquid stream 620 that is returned to the first co-current contactor 604A via intra-stage recycling. In addition, the first liquid stream 616 may include a portion 634 of the second rich liquid stream 628 that is sent to the first co-current contactor 604A via inter-stage recycling.

Furthermore, the second liquid stream 624 flowing into the second co-current contactor 604B includes a portion 636 of the second rich liquid stream 628 that is returned to the second co-current contactor 604B via intra-stage recycling. In addition, in some embodiments, the second liquid stream 624 includes an additional liquid stream 638. In some embodiments, the additional liquid stream 638 is another rich liquid stream that is sent to the second co-current contactor 604B from a third co-current contactor (not shown) via inter-stage recycling. In other embodiments, the additional liquid stream 638 is a lean liquid stream that is substantially free of impurities. For example, the additional liquid stream 638 may be generated from a portion (not shown) of the first liquid stream 616 that is sent through a regenerator (not shown) for the removal of impurities.

Figure 7A:
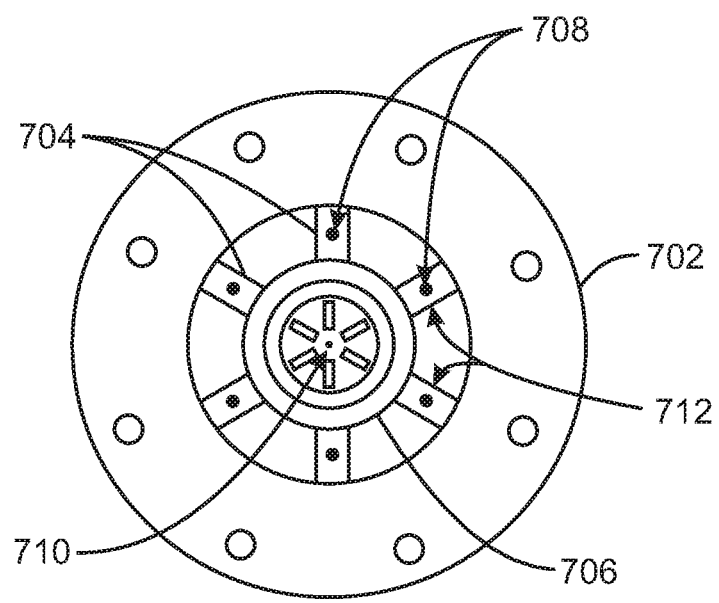
FIG. 7A is a front view of a co-current contactor.

FIG. 7A is a front view of a co-current contactor 700. The co-current contactor 700 may be implemented within a co-current contacting system, such as any of the co-current contacting systems 204, 252A-D, 402A-C, 500, 600A, and 600B discussed with respect to FIGS. 2A, 2B, 2C, 4A, 4B, 4C, 5, and 6. The co-current contactor 700 may be an axial, in-line co-current contactor located within a pipe. The front view of the co-current contactor 700 represents an upstream view of the co-current contactor 700.

The co-current contactor 700 may include an outer annular support ring 702, a number of radial blades 704 extending from the annular support ring 702, and a central gas entry cone 706. The annular support ring 702 may secure the co-current contactor 700 in-line within the pipe. In addition, the radial blades 704 may provide support for the central gas entry cone 706.

The annular support ring 702 may be designed as a flanged connection, or as a removable or fixed sleeve inside the pipe. In addition, the annular support ring 702 may include a liquid feed system and a hollow channel discussed further with respect to FIG. 6. A liquid stream may be fed to the co-current contactor 700 via the hollow channel in the annular support ring 702. The hollow channel may allow equal distribution of the liquid stream along the perimeter of the co-current contactor 700.

Small liquid channels within the annular support ring 702 may provide a flow path for the liquid stream to flow through liquid injection orifices 708 within the radial blades 704. The liquid injection orifices 708 may be located on or near the leading edge of each radial blade 704. Placement of the liquid injection orifices 708 on the radial blades 704 may allow the liquid stream to be uniformly distributed in a gas stream that is directed between the radial blades 704. Specifically, the liquid stream may be contacted by the gas stream flowing through the gaps between the radial blades 704, and may be sheared into small droplets and entrained in the gas phase.

The gas stream may also be flowed into the central gas entry cone 706 through a gas inlet 710. The central gas entry cone 706 may block a cross-sectional portion of the pipe. The radial blades 704 may include gas exit slots 712 that allow the gas stream to be flowed out of the central gas entry cone 706. This may increase the velocity of the gas stream as it flows through the pipe. The central gas entry cone 706 may direct a predetermined amount of the gas stream to the gas exit slots 712 on the radial blades 704.

Some of the liquid stream injected through the radial blades 704 may be deposited on the surface of the radial blades 704 as a liquid film. As the gas stream flows through the central gas entry cone 706 and is directed out of the gas exit slots 712 on the radial blades 704, the gas stream may sweep, or blow, much of the liquid film off the radial blades 704. This may enhance the dispersion of the liquid stream into the gas phase. Further, the obstruction to the flow of the gas stream and the shear edges created by the central gas entry cone 706 may provide a zone with an increased turbulent dissipation rate. The may result in the generation of smaller droplets that enhance the mass transfer rate of the liquid stream and the gas stream.

The size of the co-current contactor 700 may be adjusted such that the gas stream flows at a high velocity. This may be accomplished by either a sudden reduction in the diameter of the annular support ring 702 or a gradual reduction in the diameter of the annular support ring 702. The outer wall of the co-current contactor 700 may be slightly converging in shape, terminating at the point where the gas stream and the liquid stream are discharged into the downstream pipe. This may allow for the shearing and re-entrainment of any liquid film that is removed from the co-current contactor 700. Further, a radial inward ring, grooved surface, or other suitable equipment may be included on the outer diameter of the co-current contactor 700 near the point where the gas stream and the liquid stream are discharged into the downstream pipe. This may enhance the degree of liquid entrainment within the gas phase.

The downstream end of the co-current contactor 700 may discharge into a section of pipe (not shown). The section of pipe may be a straight section of pipe, or a concentric expansion section of pipe. In some embodiments, the central gas entry cone 706 terminates with a blunt ended cone or a tapered ended cone. In other embodiments, the central gas entry cone 706 terminates with a ridged cone, which may include multiple concentric ridges along the cone that provide multiple locations for droplet generation. In addition, any number of gas exit slots 712 may be provided on the cone itself to allow for the removal of the liquid film from the co-current contactor 700.

Figure 7B:
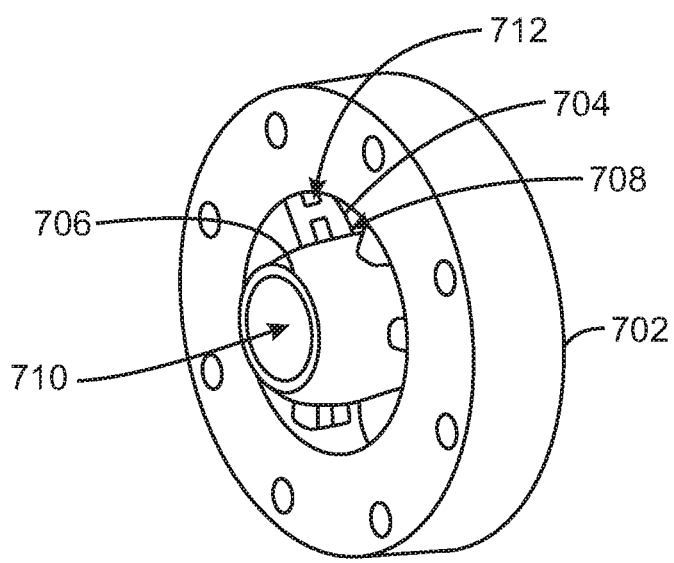
FIG. 7B is a side perspective view of the co-current contactor.

FIG. 7B is a side perspective view of the co-current contactor 700. Like numbered items are as described with respect to FIG. 7A. As shown in FIG. 7B, the upstream portion of the central gas entry cone 706 may extend further into the pipe than the annular support ring 702 and the radial blades 704 in the upstream direction. The downstream portion of the central gas entry cone 706 may also extend further into the pipe than the annular support ring 702 and the radial blades 704 in the downstream direction. The length of the central gas entry cone 706 in the downstream direction depends on the type of cone at the end of the central gas entry cone 706, as discussed further with respect to FIGS. 7C and 7D.

Figure 7C:
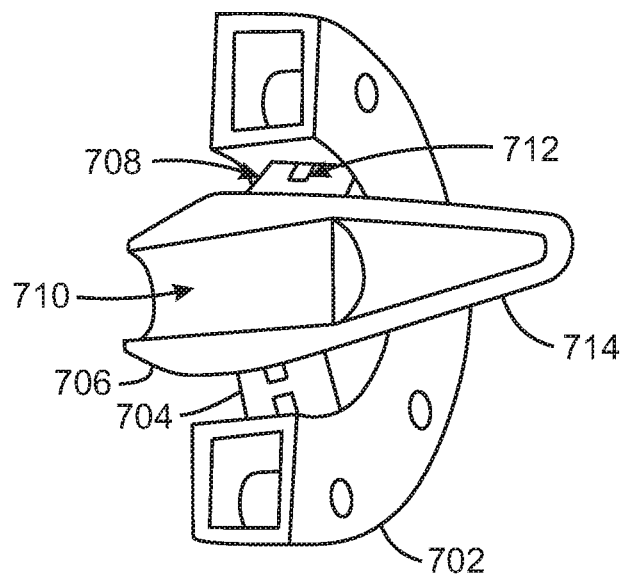
FIG. 7C is a cross-sectional side perspective view of the co-current contactor.

FIG. 7C is a cross-sectional side perspective view of the co-current contactor 700. Like numbered items are as described with respect to FIGS. 7A and 7B. According to the embodiment shown in FIG. 7C, the central gas entry cone 706 of the co-current contactor 700 terminates with a tapered ended cone 714. Terminating the central gas entry cone 706 with a tapered ended cone 714 may reduce the overall pressure drop in the pipe caused by the co-current contactor 700.

Figure 7D:
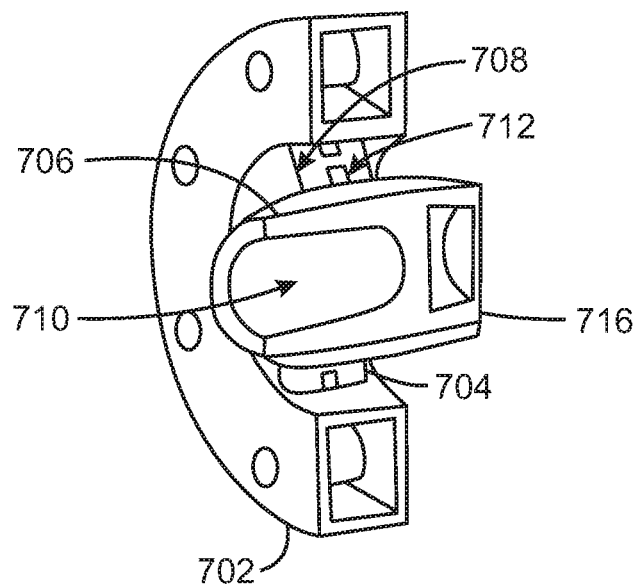
FIG. 7D is another cross-sectional side perspective view of the co-current contactor.

FIG. 7D is another cross-sectional side perspective view of the co-current contactor 700. Like numbered items are as described with respect to FIGS. 7A-C. According to the embodiment shown in FIG. 7D, the central gas entry cone 706 of the co-current contactor 700 terminates with a blunt ended cone 716. Terminating the central gas entry cone 706 with a blunt ended cone 716 may encourage droplet formation in the center of the pipe.

Method for Removing Impurities from a Gas Stream

Figure 8:
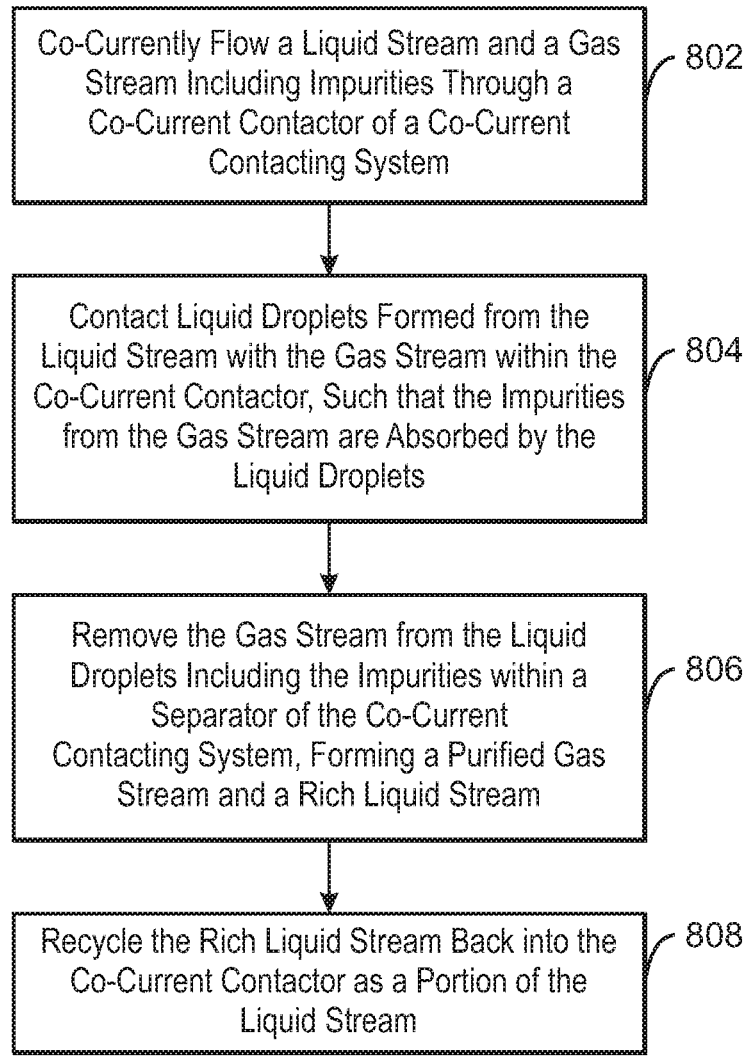
FIG. 8 is a process flow diagram showing a method for removing impurities from a gas stream.

FIG. 8 is a process flow diagram showing a method 800 for removing impurities from a gas stream. In various embodiments, the gas stream is a natural gas stream. Moreover, in some embodiments, the impurities include acid gases, such as $H_2S$ and $CO_2$. In such embodiments, the method 800 may be used to preferentially absorb $H_2S$ over $CO_2$. This may be particularly useful when the gas stream is a shale gas stream that contains a large amount of $H_2S$ but very little $CO_2$.

The method 800 is implemented by a co-current contacting system, such as any of the co-current contacting systems 204, 252A-D, 402A-C, 500, 600A, and 600B discussed with respect to FIGS. 2A-C, 4A-C, 5, and 6. Further, the method 800 is implemented within a gas processing system, such as any of the gas processing systems 200, 250, and 262 discussed with respect to FIGS. 2A-C.

The method begins at block 802, at which a liquid stream and the gas stream including the impurities are co-currently flowed into a co-current contactor of a co-current contacting system. The liquid stream may include any type of liquid that is capable of absorbing the impurities within the gas stream. In some embodiments, the liquid stream is a chemical solvent, such as an amine-based solvent that is capable of absorbing acid gases, such as $H_2S$ and $CO_2$.

In various embodiments, co-currently flowing the liquid stream and the gas stream into the co-current contactor includes flowing the liquid stream into the co-current contactor via an annular support ring and a number of radial blades extending from the annular support ring. The annular support ring secures the co-current contactor in-line within a pipe. Co-currently flowing the liquid stream and the gas stream into the co-current contactor also includes flowing the gas stream into the co-current contactor via a central gas entry cone that is supported by the radial blades, wherein a first portion of the gas stream flows through the central gas entry cone and a second portion of the gas stream flows around the central gas entry cone between the radial blades.

At block 804, liquid droplets formed from the liquid stream are contacted with the gas stream within the co-current contactor, such that the impurities from the gas stream are absorbed by the liquid droplets. This process is described further with respect to the co-current contactors 502, 604A, 604B, and 700 of FIGS. 5, 6, and 7A-D.

At block 806, the gas stream is removed from the liquid droplets including the impurities within a separator of the co-current contacting system, forming a purified gas stream and a rich liquid stream. This process is described further with respect to the separators 518, 606A, and 606B of FIGS. 5 and 6.

At block 808, the rich liquid stream is recycled back into the co-current contactor as a portion of the liquid stream entering the co-current contactor. Such intra-stage recycling of the liquid stream improves the overall efficiency of the co-current contacting system, as described with respect to FIGS. 2A-C.

The process flow diagram of FIG. 8 is not intended to indicate that the steps of the method 800 are to be executed in any particular order, or that all of the steps of the method 800 are to be included in every case. Further, any number of additional steps not shown in FIG. 8 may be included within the method 800, depending on the details of the specific implementation. For example, the gas stream may be flowed through any number of additional co-current contactors and separations systems connected in series within the pipe. In some embodiments, the co-current contactors and separators progressively purify the gas stream by removing residual impurities. Further, in some embodiments, the impurities are removed from the rich liquid stream within a regeneration system located downstream of the separator. The resulting lean liquid stream may then be recycled to the co-current contactor, or may be flowed into another co-current contactor.

According to embodiments described herein, each co-current contacting system employs intra-stage recycling of its corresponding rich liquid stream. Furthermore, the co-current contacting systems may employ inter-stage recycling of the corresponding rich liquid streams exiting the co-current contacting systems. For example, in the case of inter-stage recycling, a co-current contacting system may flow a corresponding rich liquid stream to a preceding co-current contacting system for use as a portion of the liquid stream entering the co-current contacting system.

In some embodiments, a portion of a first rich liquid stream is flowed from a first co-current contacting system to the regeneration system. Within the regeneration system, the impurities are removed from the first rich liquid stream, forming a regenerated liquid stream. The regenerated liquid stream is then flowed to a final co-current contacting system for use as a portion of a final liquid stream entering the final co-current contacting system.

Furthermore, in some embodiments, the method 800 is used for quench applications. For example, the method 800 may be used for injection of cooling water or direct injection of hot oil for ethylene quenching applications. In addition, the method 800 may be used for water wash applications, such as water wash applications including an acid gas absorber overhead stream.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A co-current contacting system for removing impurities from a gas stream, comprising:
   a plurality of co-current contacting systems connected in series, wherein a first co-current contacting system of the plurality of co-current contacting systems comprises:
   a co-current contactor configured to:
   co-currently flow the gas stream comprising impurities and a liquid stream through the co-current contactor; and
   incorporate liquid droplets formed from the liquid stream into the gas stream, such that the impurities from the gas stream are absorbed by the liquid droplets; and
   a separator configured to remove the gas stream from the liquid droplets comprising the impurities, generating a purified gas stream and a rich liquid stream comprising the impurities removed from the gas stream; and a recycle line connecting the separator and the co-current contactor and configured for recycling a first portion of the rich liquid stream from the separator to the co-current contactor, wherein a regeneration system is not disposed along said recycle line; and wherein a second portion of a rich liquid stream comprising impurities removed from the gas stream from the first co-current contacting system is sent to the regeneration system, and wherein the regeneration system is configured to remove the impurities from the rich liquid stream, forming a regenerated liquid stream, and further wherein the regenerated liquid stream is flowed to a final co-current contacting system for use as a portion of a final liquid stream entering the final co-current contacting system.

2. The co-current contacting system of claim 1, wherein the co-current contactor is located in-line within a pipe, and wherein the co-current contactor comprises:

an annular support ring configured to maintain the co-current contactor within the pipe;

a plurality of radial blades configured to allow the liquid stream to flow into the co-current contactor; and a central gas entry cone configured to allow the gas stream to flow through a hollow section within the co-current contactor.

3. The co-current contacting system of claim 1, wherein the plurality of co-current contacting systems comprises the first co-current contacting system and a plurality of downstream co-current contacting systems connected in series, wherein each downstream co-current contacting system is configured to recycle a portion of a corresponding rich liquid stream comprising impurities removed from the gas stream to a preceding co-current contacting system for use as a portion of a corresponding liquid stream.

4. The co-current contacting system of claim 1, wherein the gas stream comprises a natural gas stream, wherein the impurities comprise $H_2S$ and $CO_2$, and wherein the liquid stream comprises an amine-based solvent that preferentially absorbs $H_2S$ over $CO_2$.

5. The co-current contacting system of claim 1, wherein the co-current contacting system comprises a pump for increasing a pressure of the liquid stream flowing into the co-current contactor.

6. A method for removing impurities from a gas stream, comprising:

flowing a gas stream through a plurality of co-current contacting systems connected in series within a pipe;

in a co-current contacting system of the plurality of co-current contacting systems:

co-currently flowing a liquid stream and the gas stream comprising impurities into a co-current contactor of the co-current contacting system;

contacting liquid droplets formed from the liquid stream with the gas stream within the co-current contactor, such that the impurities from the gas stream are absorbed by the liquid droplets;

removing the gas stream from the liquid droplets comprising the impurities within a separator of the co-current contacting system, forming a purified gas stream and a rich liquid stream comprising the impurities removed from the gas stream; and recycling a first portion of the rich liquid stream comprising the impurities removed from the gas stream back into the co-current contactor as a portion of the liquid stream without removing the impurities from the at least a portion of the rich liquid stream;

flowing a second portion of the rich liquid stream comprising impurities removed from the gas stream from the co-current contacting system to a regeneration system;

removing the impurities from the second portion of the rich liquid stream within the regeneration system, forming a regenerated liquid stream; and flowing the regenerated liquid stream to a final co-current contacting system of the plurality of co-current contacting systems for use as a portion of a final liquid stream entering the final co-current contacting system.

7. The method of claim 6, wherein co-currently flowing the liquid stream and the gas stream comprising the impurities into the co-current contactor comprises:

flowing the liquid stream into the co-current contactor via an annular support ring and a plurality of radial blades extending from the annular support ring, wherein the annular support ring secures the co-current contactor in-line within a pipe; and flowing the gas stream into the co-current contactor via a central gas entry cone that is supported by the plurality of radial blades, wherein a first portion of the gas stream flows through the central gas entry cone and a second portion of the gas stream flows around the central gas entry cone between the plurality of radial blades.

8. The method of claim 6, comprising:

flowing a corresponding rich liquid stream comprising the impurities removed from the gas stream from any of the plurality of co-current contacting systems to a preceding co-current contacting system for use as a portion of a corresponding liquid stream.

9. The method of claim 6, wherein the gas stream comprises a natural gas stream, wherein the impurities comprise $H_2S$ and $CO_2$, and wherein the liquid stream comprises an amine-based solvent that preferentially absorbs $H_2S$ over $CO_2$.

10. A gas processing system for removing impurities from a gas stream, comprising:

a first co-current contacting system, comprising:

a first co-current contactor configured to:

co-currently flow the gas stream comprising impurities and a first liquid stream through the first co-current contactor; and incorporate first liquid droplets formed from the first liquid stream into the gas stream, such that the impurities from the gas stream are absorbed by the first liquid droplets;

a first separator configured to remove the gas stream from the first liquid droplets comprising the impurities, forming a first rich liquid stream comprising the impurities removed from the gas stream and a partially-purified gas stream comprising residual impurities; and a first recycle line connecting the first separator and the first co-current contactor and configured for recycling at least a portion of the first rich liquid stream from the first separator to the first co-current contactor, wherein a regeneration system is not disposed along said first recycle line; and a second co-current contacting system, comprising:

a second co-current contactor configured to:

co-currently flow the partially-purified gas stream comprising the residual impurities and a second liquid stream through the second co-current contactor; and incorporate second liquid droplets formed from the second liquid stream into the partially-purified gas stream, such that the residual impurities from the partially-purified gas stream are absorbed by the second liquid droplets; and a second separator configured to remove the partially-purified gas stream from the second liquid droplets comprising the residual impurities, forming a purified gas stream and a second rich liquid stream comprising the residual impurities removed from the gas stream; and a second recycle line connecting the second separator and the second co-current contactor and configured for recycling at least a first portion of the second rich liquid stream from the second separator to the second co-current contactor, wherein the regeneration system is not disposed along said second recycle line; and a third recycle line connecting the second separator and the first co-current contactor and configured for recycling at least a second portion of the second rich liquid stream from the second separator to the first co-current contactor, wherein the regeneration system is not disposed along said third recycle line; and the regeneration system.

11. The gas processing system of claim 10, wherein the first co-current contacting system is configured to flow a second portion of the first rich liquid stream to the regeneration system, and wherein the regeneration system is configured to:

remove the impurities from the second portion of the first rich liquid stream, forming a lean liquid stream; and flow the lean liquid stream to the second co-current contacting system for use as a second portion of the second liquid stream.

12. The gas processing system of claim 10, wherein the first co-current contacting system and the second co-current contacting system are connected in series within a pipe.

13. The gas processing system of claim 10, wherein the gas processing system comprises any number of additional co-current contacting systems.

14. The gas processing system of claim 10, wherein the first liquid stream and the second liquid stream comprise a chemical solvent.

15. The gas processing system of claim 10, wherein the gas stream comprises a natural gas stream, and wherein the impurities comprise acid gases.

16. The gas processing system of claim 15, wherein the acid gases comprise $H_2S$ and $CO_2$ and wherein the first liquid stream and the second liquid stream comprise an amine-based solvent that preferentially absorbs $H_2S$ and $CO_2$.

17. The method of claim 6, wherein the at least a portion of the rich liquid stream is about 10-30% of the rich liquid stream.

* * * * *